United States Patent
Fu et al.

(10) Patent No.: US 10,313,610 B2
(45) Date of Patent: Jun. 4, 2019

(54) IMAGE SENSORS WITH DYNAMIC PIXEL BINNING

(71) Applicant: QUALCOMM Incorporated, San Diego, CA (US)

(72) Inventors: Zhengming Fu, Austin, TX (US); Soo Youn Kim, San Diego, CA (US); Jan Christian Huber, Bee Cave, TX (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/264,465

(22) Filed: Sep. 13, 2016

(65) Prior Publication Data
US 2017/0302866 A1    Oct. 19, 2017

Related U.S. Application Data

(60) Provisional application No. 62/322,704, filed on Apr. 14, 2016.

(51) Int. Cl.
| | |
|---|---|
| H04N 5/347 | (2011.01) |
| H04N 5/3745 | (2011.01) |
| H04N 9/04 | (2006.01) |
| H04N 5/355 | (2011.01) |

(52) U.S. Cl.
CPC ........... *H04N 5/347* (2013.01); *H04N 5/3559* (2013.01); *H04N 5/37455* (2013.01); *H04N 5/37457* (2013.01); *H04N 9/045* (2013.01)

(58) Field of Classification Search
CPC .. H04N 5/347; H04N 5/3559; H04N 5/37455; H04N 5/37457; H04N 3/155
See application file for complete search history.

(56) References Cited

U.S. PATENT DOCUMENTS

| | | |
|---|---|---|
| 6,888,122 B2 | 5/2005 | Fossum |
| 2004/0135063 A1 | 7/2004 | Dosluoglu |
| 2005/0012836 A1 | 1/2005 | Guidash |

(Continued)

FOREIGN PATENT DOCUMENTS

| | | |
|---|---|---|
| DE | 102008052930 A1 | 4/2010 |
| WO | 2011053711 A1 | 5/2011 |

OTHER PUBLICATIONS

International Search Report and Written Opinion—PCT/US2017/022039—ISA/EPO—dated Jun. 1, 2017.

(Continued)

*Primary Examiner* — Antoinette T Spinks
(74) *Attorney, Agent, or Firm* — Kilpatrick Townsend & Stockton

(57) ABSTRACT

Methods, systems, computer-readable media, and apparatuses for dynamic pixel binning are presented. In one example, an image sensor system includes a plurality of sensor elements; a plurality of floating diffusion regions in communication with the plurality of sensor elements, each floating diffusion region of the plurality of floating diffusion regions configured to be selectively enabled; and at least one comparison circuit coupled to at least two floating diffusion regions of the plurality of floating diffusion regions, the comparison circuit configured to: receive input signals from the two floating diffusion regions, compare the input signals, and output a comparison signal based on the comparison of the input signals.

26 Claims, 21 Drawing Sheets

(56) References Cited

U.S. PATENT DOCUMENTS

| | | | |
|---|---|---|---|
| 2006/0274176 A1* | 12/2006 | Guidash | H01L 27/14643 348/300 |
| 2008/0062290 A1 | 3/2008 | Lahav et al. | |
| 2009/0066782 A1 | 3/2009 | Choi et al. | |
| 2009/0153716 A1* | 6/2009 | Ota | H01L 27/14603 348/308 |
| 2010/0118167 A1 | 5/2010 | Johnson | |
| 2010/0182465 A1 | 7/2010 | Okita | |
| 2010/0210903 A1 | 8/2010 | Ishihara | |
| 2010/0328505 A1 | 12/2010 | Imamura | |
| 2011/0019051 A1 | 1/2011 | Yin et al. | |
| 2011/0101205 A1 | 5/2011 | Tian et al. | |
| 2012/0188427 A1 | 7/2012 | Solhusvik | |
| 2012/0262616 A1 | 10/2012 | Sa et al. | |
| 2013/0021441 A1* | 1/2013 | Kim | H04N 5/3745 348/46 |
| 2013/0314574 A1* | 11/2013 | Ishii | H01L 27/1461 348/302 |
| 2014/0118592 A1 | 5/2014 | Yoon et al. | |
| 2014/0218580 A1 | 8/2014 | Mayer et al. | |
| 2014/0226046 A1 | 8/2014 | Lahav et al. | |
| 2015/0350582 A1 | 12/2015 | Korobov et al. | |
| 2016/0037117 A1 | 2/2016 | Ono et al. | |
| 2016/0105624 A1 | 4/2016 | Handa et al. | |
| 2016/0337567 A1 | 11/2016 | Okura et al. | |
| 2017/0064211 A1 | 3/2017 | Omid-Zohoor | |
| 2017/0302865 A1 | 10/2017 | Fu et al. | |
| 2018/0027192 A1 | 1/2018 | Morisaki | |

OTHER PUBLICATIONS

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.

* cited by examiner

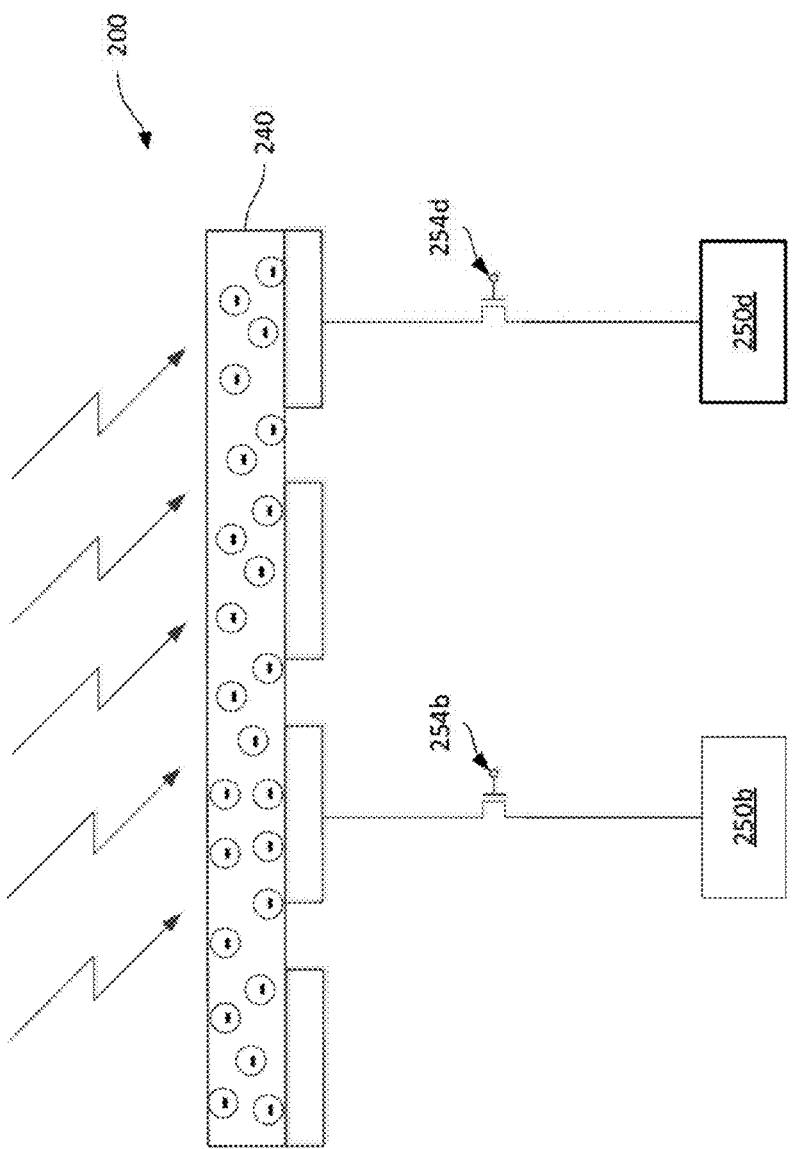

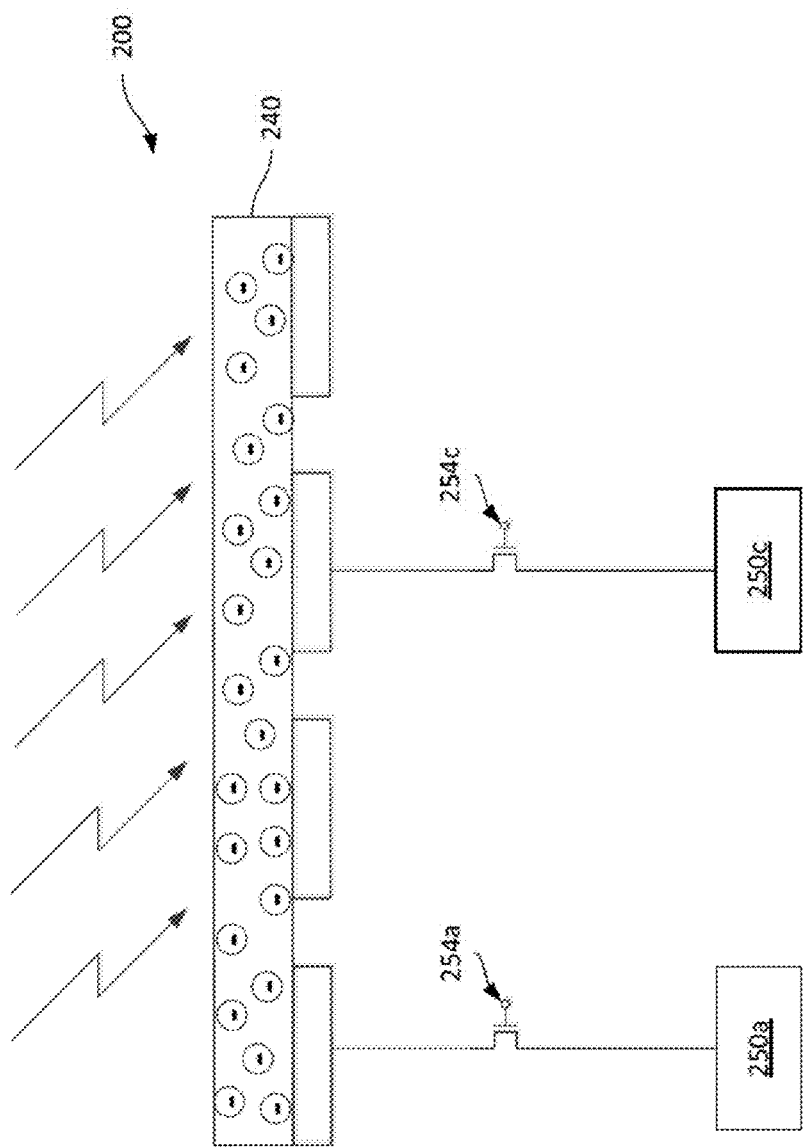

IMAGE SENSORS WITH DYNAMIC PIXEL BINNING

CROSS-REFERENCE TO RELATED APPLICATIONS

This application claims the benefit of U.S. Provisional Application No. 62/322,704, filed Apr. 14, 2016, entitled "Image Sensor with Dynamic Pixel Binning" which is incorporated herein by reference.

BACKGROUND

Image sensors are used in various applications (in-vehicle, surveillance, medical, and so on), and high quality image sensors can be desirable. One type of image sensor that can produce high-quality images is a photo-sensitive layer material such as organic-photoconductive-film ("OPF") or quantum dot film ("QDF") laminated CMOS sensor.

BRIEF SUMMARY

Various examples are described for image sensors with dynamic pixel binning. For example, one example image sensor system for dynamic pixel binning includes a plurality of sensor elements; a plurality of floating diffusion regions in communication with the plurality of sensor elements, each floating diffusion region of the plurality of floating diffusion regions configured to be selectively enabled; and at least one comparison circuit coupled to at least two floating diffusion regions of the plurality of floating diffusion regions, the comparison circuit configured to: receive input signals from the two floating diffusion regions, compare the input signals, and output a comparison signal based on the comparison of the input signals.

An example method for dynamic pixel binning includes enabling a first binning configuration in an image sensor system to establish a first pixel configuration using a first diffusion region, the first pixel configuration comprising a plurality of sensor elements; reading a first pixel value from the first floating diffusion region; enabling a second binning configuration in the image sensor system, the second binning configuration maintaining the first pixel configuration using a second floating diffusion region, the second floating diffusion region different from the first floating diffusion region; reading a second pixel value from the second floating diffusion regions, comparing the first and second pixel values, and outputting a comparison signal indicating a result of the comparing.

Another example system includes a two-dimensional array of pixel elements; a plurality of floating diffusion regions, each floating diffusion region corresponding to different one of the pixel elements, each floating diffusion region configured to be individually and selectively enabled; a plurality of comparison circuits, each comparison circuit coupled to an output of two floating diffusion regions, wherein no floating diffusion region is coupled to two comparison circuits, each of the comparison circuits configured to: receive input signals from the respective two floating diffusion regions, compare the input signals, and output a comparison signal based on the comparison of the input signals.

A further example method for dynamic pixel binning includes transmitting a first enable signal to an image sensor system during a first frame period, the image sensor system comprising: a two-dimensional array of pixel elements; a plurality of floating diffusion regions, each floating diffusion region corresponding to different one of the pixel elements, each floating diffusion region configured to be individually and selectively enabled; a plurality of comparison circuits, each comparison circuit coupled to an output of two floating diffusion regions, wherein no floating diffusion region is coupled to two comparison circuits, each of the comparison circuits configured to receive input signals from the respective two floating diffusion regions, compare the input signals, and output a comparison signal based on the comparison of the input signals; the first enable signal configured to enable a first group of floating diffusion regions; transmitting a second enable signal to the image sensor system during a second frame period, the second enable configured to enable a second group of floating diffusion regions, the floating diffusion regions of the second group of floating diffusion regions different from the floating diffusion regions of the first group of floating diffusion regions; receive a sensor signal from the image sensor system, the sensor signal comprising comparison values based on the comparison signals; and detecting motion based on the sensor signal.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 2A-2H show an example image sensor with dynamic pixel binning;

DETAILED DESCRIPTION

Examples are described herein in the context of image sensors with dynamic pixel binning. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Some image sensors use materials that generate electrons in response to incident photons. The generated charge can be accumulated (with or without a multiplication step), and then a signal indicative of the amount of accumulated charge can be read. Materials such OPF and QDF can be used to detect incident light and generate charges. Charge may be accumulated in charge storage silicon regions such as floating diffusion regions. The charge stored in these floating diffusion regions can then be read using sampling and analog-to-digital converting circuitry to obtain a digital value indicative of an amount of light received at a corresponding location on the sensor.

Many image sensors are arranged as rows and columns of sensor elements, where each sensor element covers a specific area of the image sensor, e.g., a pixel. A sensor element, or a pixel, can include an optical element set such as a microlens and/or a color filter in optical channel that lay on the top of a photosensitive layer generating charge such as an OPF or QDF layer.

In one design, each sensor element can be associated with a charge accumulation region, as an example, on silicon, and subsequent reading of electron in that charge accumulation region will provide information indicative of the incident light intensity on the corresponding sensor element. Techniques described below allow for the charge accumulation region associated with one sensor element to accumulate charge from a plurality of sensor elements, while the charge accumulation regions associated with the others of the plurality of sensor elements are disabled. Thus, multiple sensor photo-detecting elements share a single charge accumulation region. Additionally, techniques for interleaving shared charge accumulation regions are disclosed below.

Figure 1A:
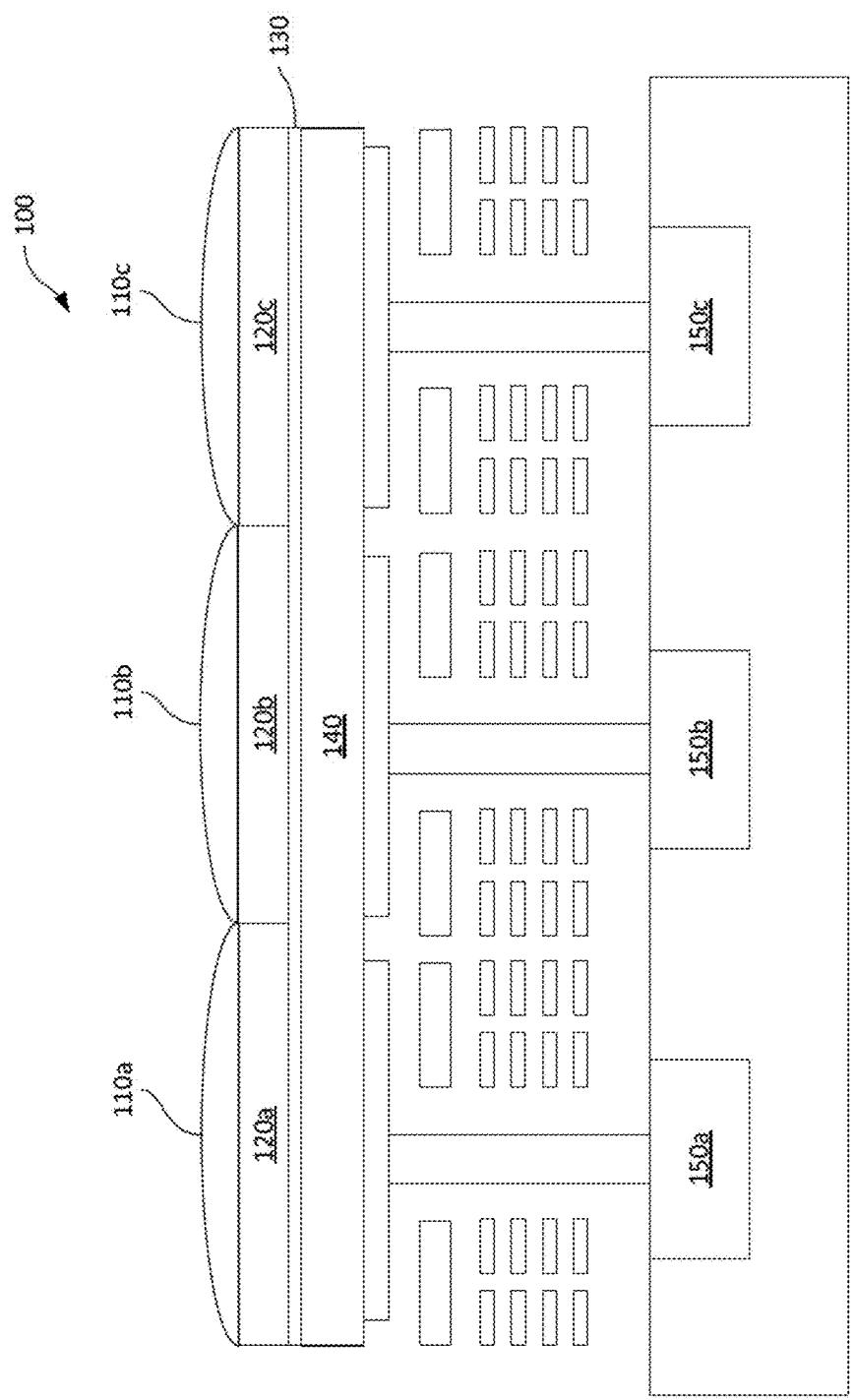
FIGS. 1A-1D show an example OPF or QDF laminated CMOS sensor.

Referring to FIG. 1A, FIG. 1A shows an example of OPF-coated CMOS sensor 100. The sensor 100 includes an array of abutted sensor elements that include micro lenses 110a-c and color filters 120a-c positioned above a planarization layer 130. These components are disposed on an OPF layer 140, each coupled to a charge accumulation region 150a-c, which may be, for example, floating diffusion regions, which represent a capacitor in a silicon layer that can be charged with the electrons from the OPF layer. And while this example references an OPF layer, other suitable sensor photo-sensitive lamination material technologies may be used as well, such as a QDF that may be laminated in image sensors. Photons received by the photo-sensitive layer generate the release of electrons in the photo-sensitive layer, e.g., OPF layer 140, which then travel into the floating diffusion regions 150a-c, where the electron charge is accumulated. Accumulated charge for each sensor element can then be read to determine a corresponding light intensity value. This process can be seen in more detail in FIGS. 1B-1D.

Figure 1B:
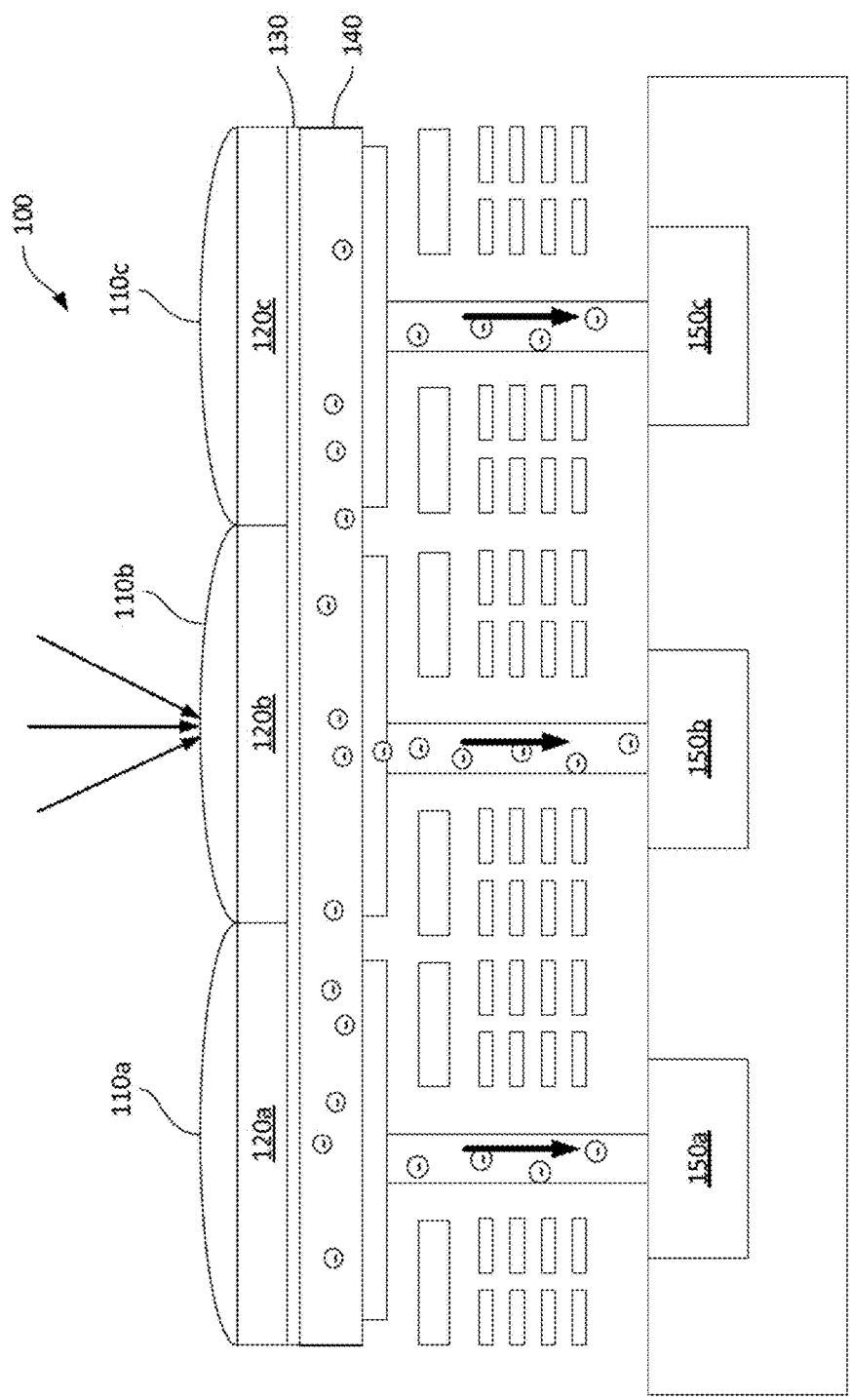

In FIG. 1B, the OPF layer 140 is charged to a predetermined voltage, e.g., 10 volts. After which, projecting light onto the pixel elements of the sensor 100 will result in output signals that can be read from the floating diffusion regions 150a-c to obtain image information. More specifically, photons projected onto the pixel elements, passing through micro lenses 110a-c and the corresponding color filters 120a-c are focused on the OPF layer 140. Within the OPF layer 140, received photons cause the release of electrons, which travel to the floating diffusion regions 150a-c residing in the silicon base layer corresponding to the respective micro lens 110a-c and color filter 120a-c above. The accumulation of electrons in the floating diffusion regions 150a-c, which is linearly correlated with light projected on the corresponding pixel element creates an electric charge level that corresponds to a voltage proportional to the number of electrons accumulated in each floating diffusion region 150a-c.

Figure 1C:
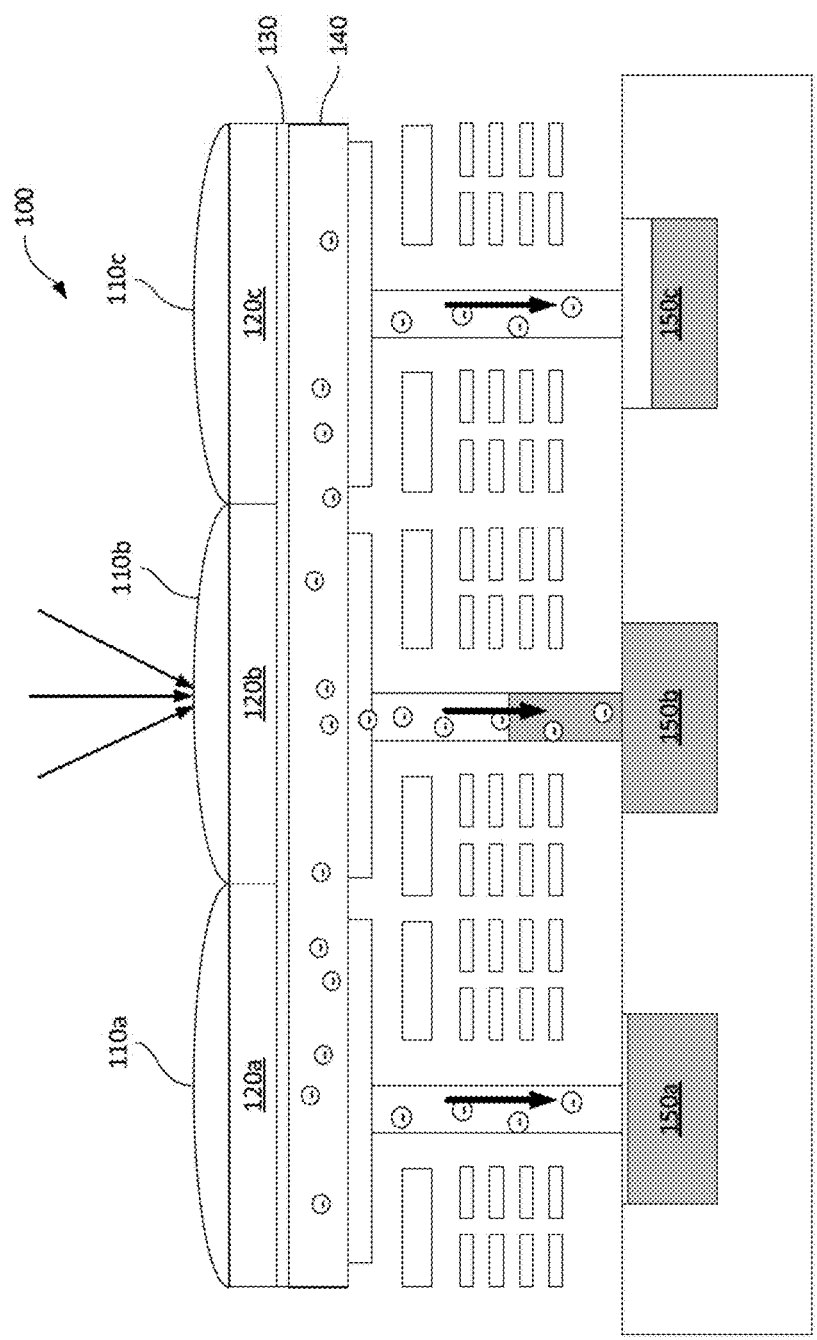

Referring to FIG. 1C, over time, the accumulation of electrons increases the charge within each floating diffusion regions 150a-c, which is illustrated based on the amount of shading in each floating diffusion region 150a-c. For example, the right-most floating diffusion region 150c is only partially saturated with charge, the left-most floating diffusion region 150a is nearly saturated with charge, and the center floating diffusion region 150b is over-saturated with charge. As discussed above, the respective amounts of accumulated charge are proportional to the respective number of accumulated electrons, which in turn are proportional to the number of photons that struck the sensor 100.

Figure 1D:
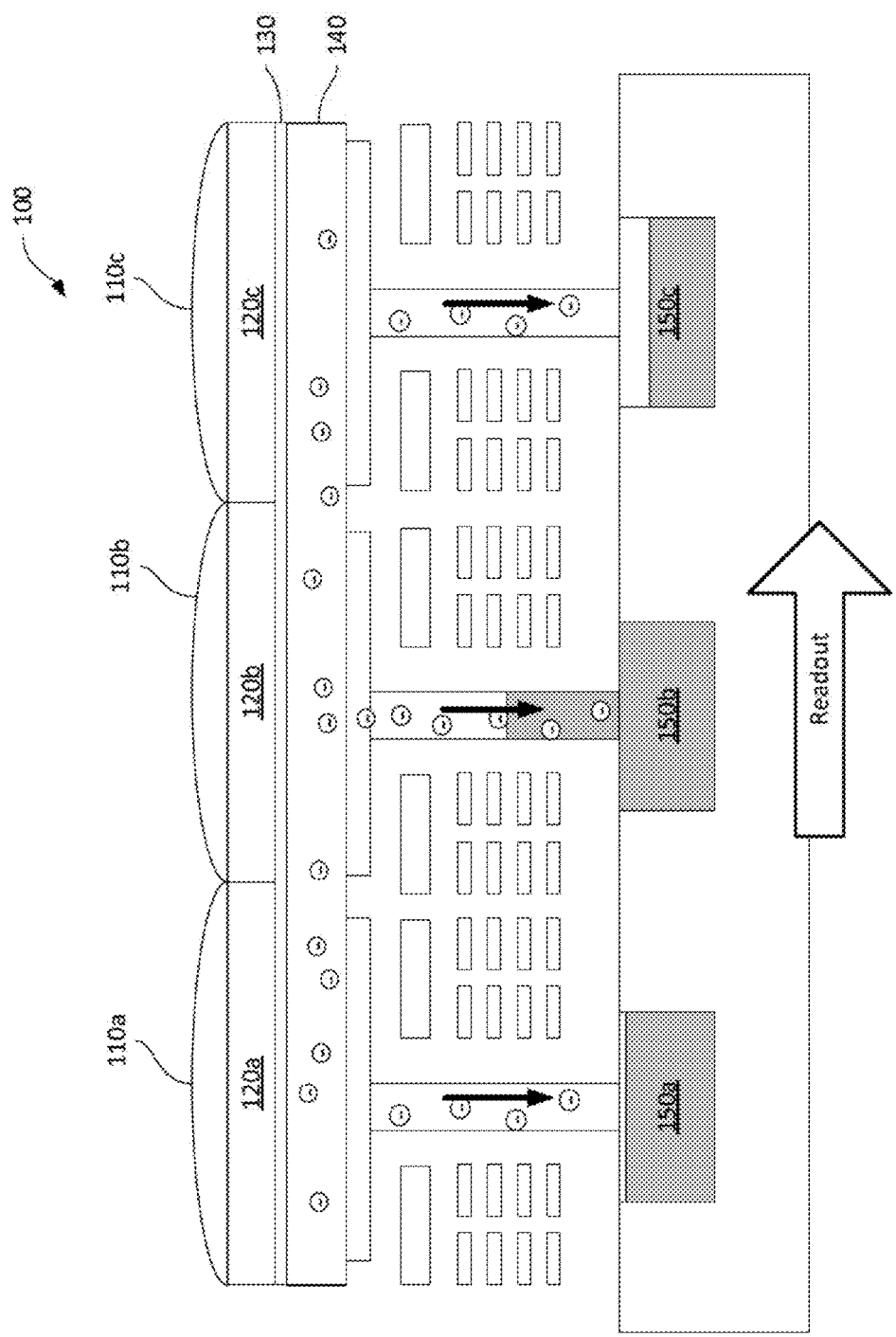

Referring to FIG. 1D, the accumulated charge from each floating diffusion region will be read using a sampling circuit, including an amplifier to obtain and amplify the charge from the respective floating diffusion region, to determine the accumulated charge, which indicates the amount of photons received at a particular location, e.g., pixel element, on the sensor. This accumulated charge can then be sampled, converted from analog signal to digital value and used to generate a corresponding pixel value, such as a light intensity or a color value.

The basic photo-sensitive layer, e.g., OPF or QDF, laminated CMOS sensor shown in FIGS. 1A-1D can be enhanced with additional features that may be of value in different scenarios. One such feature is referred to as "pixel-binning." Referring again to FIG. 1B, as can be seen in the OPF sensor 100, within each pixel element, each micro lens 110a-c and color filter 120a-c has a corresponding floating diffusion region 150a-c beneath it. Thus, photons that strike the left-most micro lens 110a generally proceed through the corresponding color filter 120a, are focused onto the photo-sensitive layer within pixel elements, and released electrons primarily travel into the corresponding floating diffusion region 150a. Pixel-binning, by contrast, disables one or more floating diffusion regions 150a-c, thereby diverting released electrons from neighboring pixel elements to a common active floating diffusion region. For example, the image sensor 100 shown in FIG. 1B could be configured such that electrons released based on photons striking any of micro lenses 110a-c and color filters 120a-c of those pixel elements travel into the center floating diffusion region 150b by disabling floating diffusion regions 150a and 150c. By doing so, the resolution of the image sensor decreases, because the number of floating diffusion regions is reduced and electrons converge into the same active floating diffusion of the shared pixel elements, however, some applications, such as motion detection, may not require high resolution images and some applications, reducing resolution results in power-saving benefits for system operation.

Figure 2A:
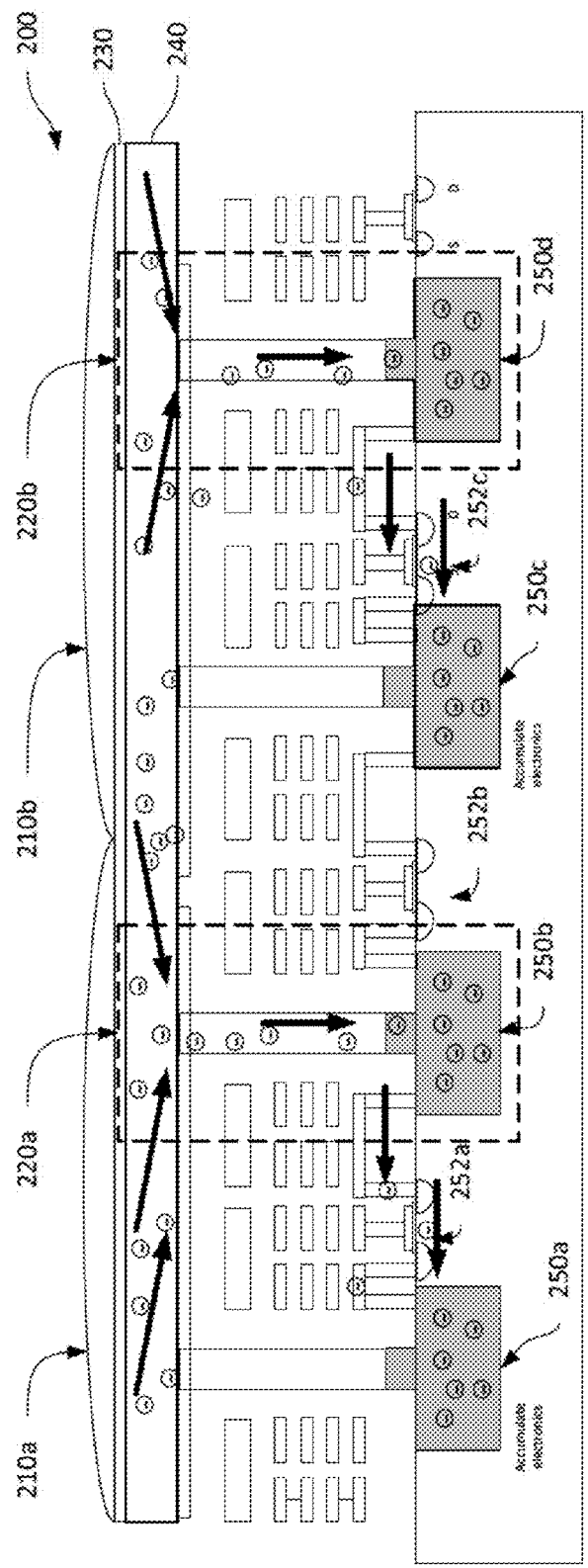
Figure 2B:
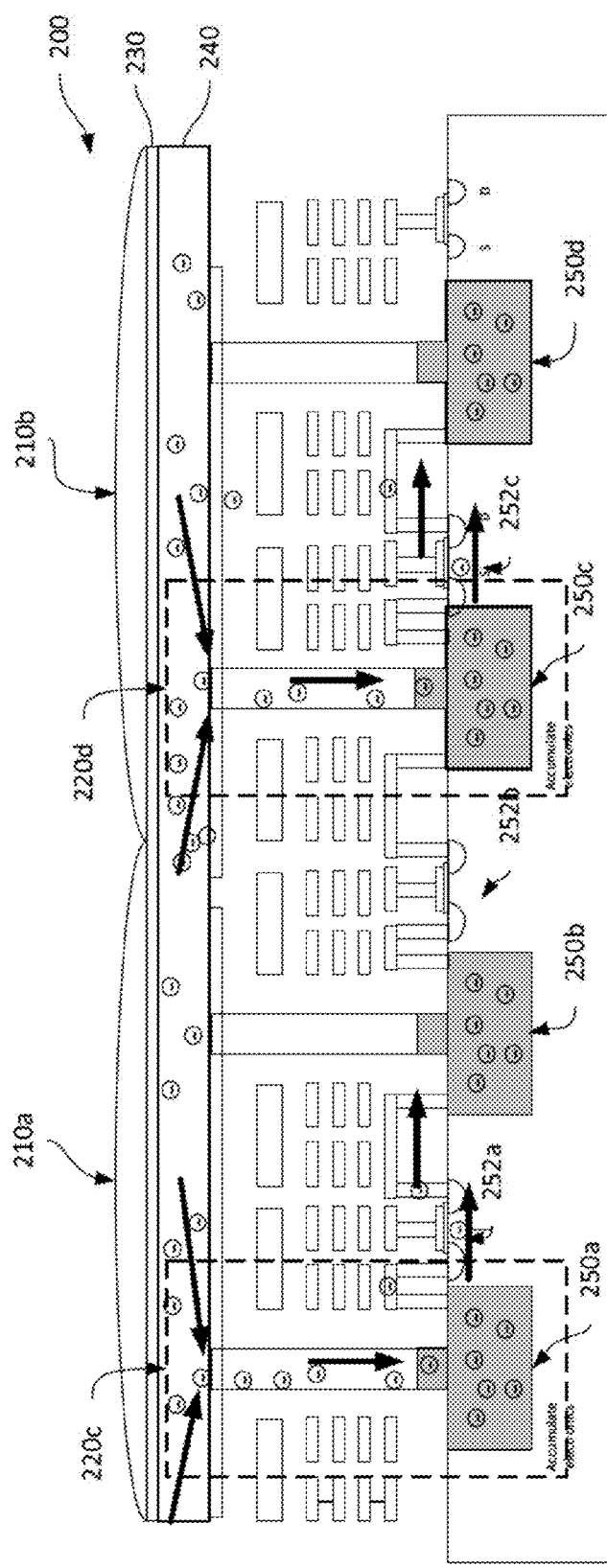
Figure 2C:
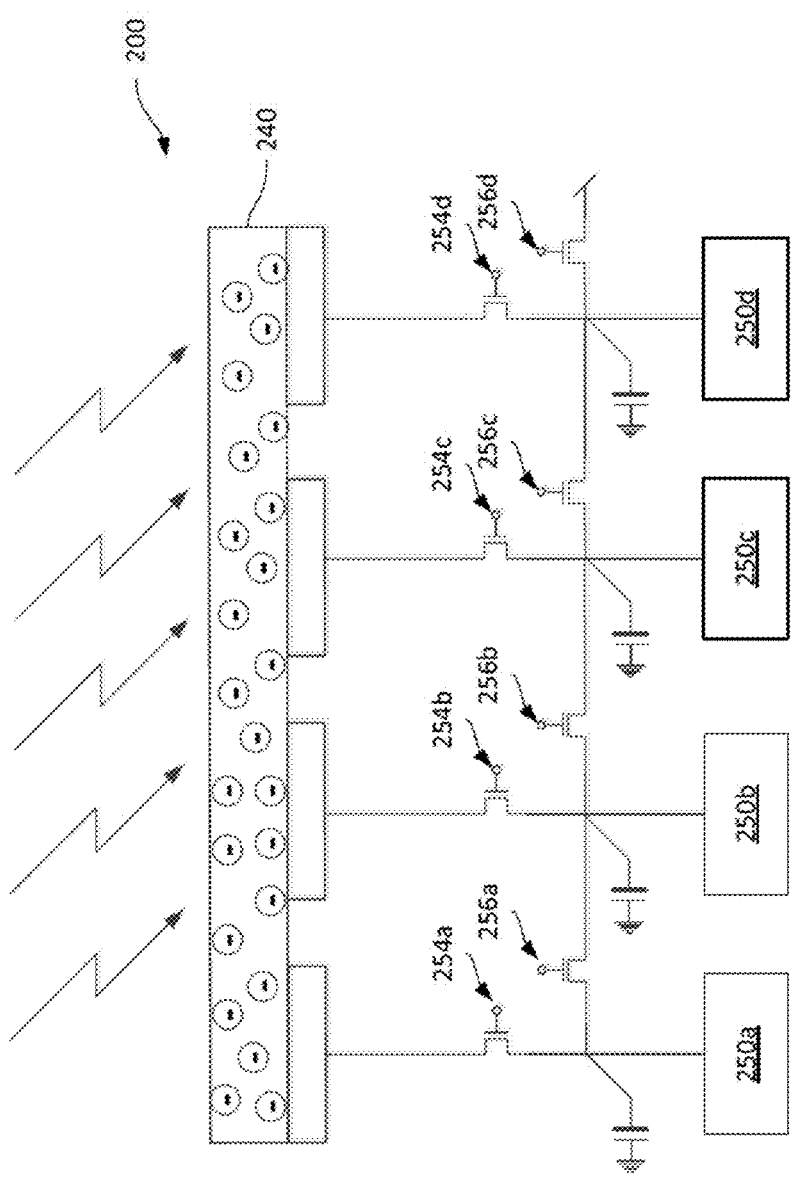

Referring now to FIGS. 2A-2C, FIGS. 2A-2C show an example image sensor 200. The image sensor includes micro lenses 210a,b, a planarization layer 230, a photo-sensitive layer 240, and floating diffusion regions 250a-d as discussed above with respect to the image sensor 100 shown in FIGS. 1A-1D. In this example sensor 200, unlike the example shown in FIGS. 1A-D, the sensor elements include the micro lenses 210a,b, but do not include color filters. It should be appreciated that sensor elements according to different examples may include various components, including lenses or micro lenses, filters, etc., based on the desired optical characteristics of the respective example sensor. In addition to the components discussed above, the image sensor 200 includes bridges 252a-c, which will be discussed in more detail below.

The image sensor 200 shown in FIGS. 2A-2C is configured to provide dynamic pixel-binning. Binned pixels are shown using shaded regions 220a-d. Thus, in FIG. 2A, electrons are binned into floating diffusion regions 250b and 250d. In this example, two floating diffusion regions, 250a and 250c, are disabled.

For example, as can be seen in FIG. 2C, the photo-sensitive layer 240 may be electrically coupled to multiple floating diffusion regions 250a-d via a transistor 254a-d that may be selectively gated on or off. Thus, by disabling transistors 254a and 254c and enabling transistors 254b and 254d, electrons released in the photo-sensitive layer cannot flow (directly) to floating diffusion regions 250a and 250c, but instead must flow to floating diffusion regions 250b and 250d. FIG. 2D shows a conceptual circuit diagram illustrating the effect of disabling transistors 254a and 254c (and disabling each of the bridges 252a-c). As can be seen in FIG. 2D, the electrical connections to floating diffusion regions 250a and 250c have been disabled and thus, they are not available to accumulate charge (and thus are not shown). Bridges 252a-c, implemented in part in this example by transistors 256a-d will be discussed in more detail below.

In the configuration shown in FIG. 2B, floating diffusion regions 250a, 250c have been re-activated, by gating on transistors 254a and 254c, while floating diffusion regions 250b, 250d have been disabled, by gating off transistors 254b, and 254d. Thus, electrons from the photo-sensitive layer 240 move into floating diffusion regions 250a and 250c. FIG. 2E shows a conceptual circuit diagram illustrating the effect of disabling transistors 254b and 254d (and disabling each of the bridges 252a-c), while enabling transistors 254a and 254c. In this example, the image sensor 200 is configured to dynamically reconfigure or eliminate binning configurations based on one or more commands received from a processor or other suitable controller.

FIGS. 2A and 2B illustrate two pixel binning configurations for the image sensor 200 that are used on two successive frames. Thus, the image sensor 200 is configured as shown in FIG. 2A and after a frame period, the enabled floating diffusion regions 250b,d are read, the image sensor is reconfigured as shown in FIG. 2B, and after a second frame period, the enabled floating diffusion regions 250a,c are read. Thus, over a series of successive frames, the image sensor 200 may alternate between the binning configurations shown in FIGS. 2A and 2B. Such alternating between the binning configurations can be referred to as "interleaving." Interleaving may be advantageously employed in some applications, such as motion detection, to more efficiently detect motion within two successive captured image frames. While the examples shown in FIGS. 2A and 2B interleave between two configurations, interleaving is not limited to alternating between two configurations, but instead could include switching between two or more different configurations.

For example, as may be in seen in FIGS. 2A and 2B, the interleaved binning employs four adjacent floating diffusion regions 250a-d such that in any frame, two are active and two are disabled (or operate as overflow through the use of bridges 252a-c, described in more detail below), and the active and disabled floating diffusion regions 250a-d alternate on successive frames. Thus, successive images captured provide the same resolution, and if the captured scene is static between the two frames, approximately the same pixel information is captured. However, by interleaving the binning operation, it may make detecting motion between two successive frames more efficient. For example, as may be seen in FIGS. 2A-2C, floating diffusion regions 250b and 250c, while activated on alternate frames in an interleaving configuration, receive electrons from similar regions within the image sensor 200.

Comparing the output of floating diffusion region 250b from one frame with the output of floating diffusion region 250c in the next frame may indicate whether an object within a scene viewed by the image sensor 200 is moving. For example, if the read-out of floating diffusion region 250b, e.g., a sampled voltage, is significantly lower (or higher) than the read-out of floating diffusion region 250c on successive frames, the change in the number of incident photons may be due to movement in a scene viewed by the sensor.

In addition to dynamically configuring pixel binning configurations, the sensor also is configured to provide shared floating diffusion regions. In this example, FIG. 2A shows that bridge 252a has been activated to allow accumulated electrons in floating diffusion region 250b to travel into neighboring floating diffusion region 250a, which may increase the apparent capacity of floating diffusion region 250b. In this example, when bridge 252a is enabled, some of the electrons accumulating in floating diffusion region 250b are able to traverse the bridge 252a and accumulate in floating diffusion region 250a. Similarly, if bridge 252c is enabled, some of the electrons accumulating in floating diffusion region 250d are able to traverse the bridge 252c and accumulate in floating diffusion region 250c.

Figure 2F:
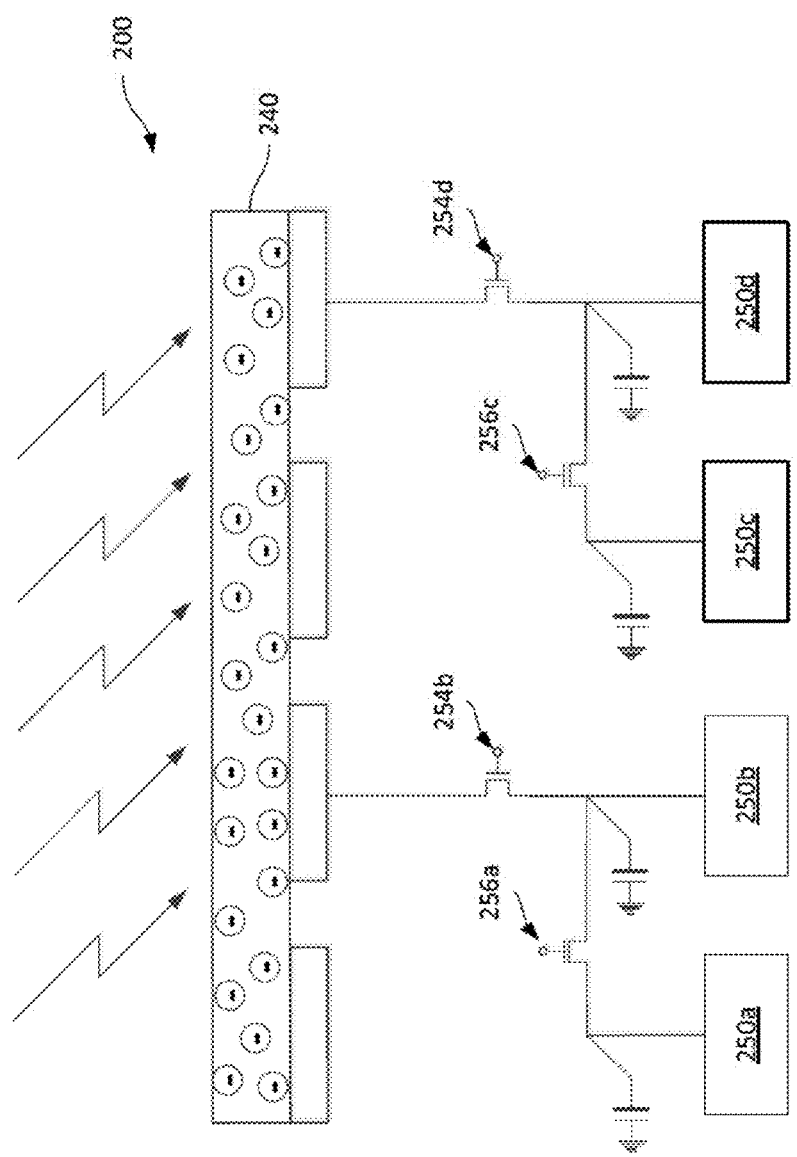
Figure 2G:
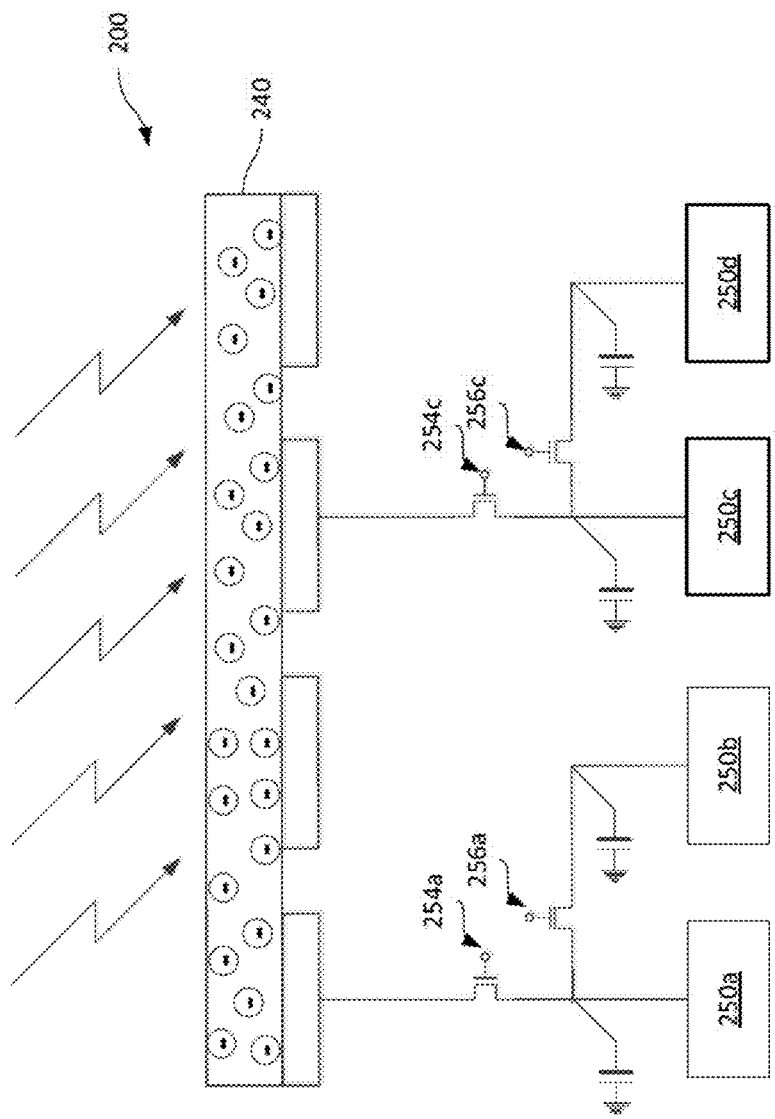

Referring again to FIG. 2C, the bridges 252a-c comprise transistors 256a-c, respectively. Transistor 256d illustrates a portion of a bridge to a further floating diffusion region not shown in FIG. 2C. To activate a bridge, the corresponding transistor, in this example, may be gated on. Referring to FIG. 2F, FIG. 2F shows the sensor 200 configuration of FIG. 2D, where floating diffusion regions 250b and 250d have been enabled by gating on transistors 254b and 254d, and floating diffusion regions 250a and 250c have been disabled by gating off transistors 254a and 254c. However, bridges 252a and 252c have been enabled by gating on transistors 256a and 256c. Thus, while electrons may not flow directly from the photo-sensitive layer 240 to either of floating diffusion regions 250a and 250c, electrons may indirectly flow to those floating diffusion regions 250a, 250c, after first flowing into (or toward) floating diffusion regions 250b and 250d, and traversing the respective bridge 252a, 252c. Similarly, FIG. 2G illustrates the configuration of FIG. 2D, where electrons released from the photo-sensitive layer are binned into floating diffusion regions 250a and 250c, but may traverse bridges 252a and 252c, respectively.

Figure 2H:
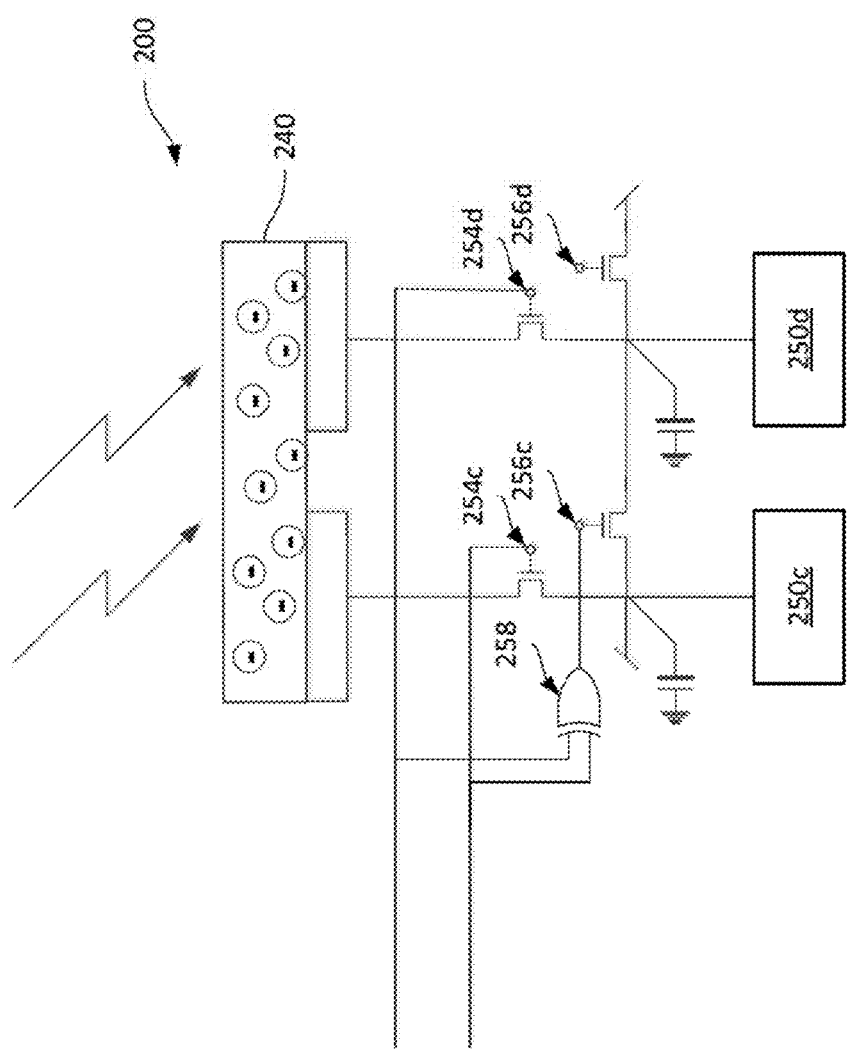

In some examples, bridges 252a-c may be enabled when only one of the floating diffusion regions connected to the bridge is enabled, thus providing additional charge accumulation capacity to a binned pixel. For example, when floating diffusion region 250a is enabled, but floating diffusion region 250b is disabled, bridge 252a may be enabled. However, if both floating diffusion regions 250a and 250b are enabled, the bridge 252a may be disabled to prevent inaccurate image sensor output. To enable such mutually-exclusive operation, circuitry, such as an exclusive-OR ("XOR") gate may be coupled to bridge 252a. Referring now to FIG. 2H, which shows a portion of the sensor 200, an XOR gate 258 is coupled to bridge transistor 256c. Inputs to the XOR gate 208 in this example are supplied by the signals driving transistors 254a and 254b such that when both transistors 254a, 254b are enabled (or both are disabled), the output of the XOR gate 258 disables the bridge 252a. But when only one of the two transistors 254a, 254b is enabled, the XOR gate 258 enables the bridge 252a. While this is one example for implementing, in hardware, a pixel-binning and bridging operation, other implementations may be employed as well, such as by providing separate enable lines for each floating diffusion transistor 254a-d and for each bridge transistor 256a-d, which each may be independently controlled.

By enabling one or more bridges, the image sensor 200 is able to effectively increase the amount of charge that the middle floating diffusion region 250b can accumulate. Again, in a pixel binning operation, one floating diffusion region accumulates charges from multiple photon collection elements, e.g., micro lenses and color filters. In a bright environment when using pixel binning, it may be that the number of electrons binned into a single floating diffusion region exceeds the capacity of the floating diffusion region due to the rate at which electrons are released by incoming photons and the rate at which the accumulated charge is read from the floating diffusion regions. Further, in a case where pixel binning is employed, other floating diffusion regions stand idle, e.g., when the image sensor 200 uses pixel binning to accumulate charge in the middle floating diffusion region 250b, floating diffusion regions 250a and 250c are idle and do not accumulate charge. But by enabling one or both of bridges 252a and 252b, the capacity of floating diffusion region 250b effectively can be increased by the capacity of either, or both, of floating diffusion regions 250a or 250c. When the floating diffusion charges are later read, the combined readings from 250b and either, or both, of 250a and 250c can be read as a single value for the entire binned group of sensor elements. In this context, a sensor element refers to a micro lens or, in some examples, a micro lens and a corresponding color filter, or other discrete element through which photons are received and provided to an OPF or similar layer in which photons are used to release electrons to a floating diffusion region.

Further, in the example shown in FIGS. 2A-2C, the bridges 252a,b may be dynamically enabled or disabled. Thus, the effective capacity of floating diffusion region 250b can be dynamically changed, such as to accommodate changing operational requirements for the image sensor 200. For example, in a low light setting, the bridges 252a,b may be disabled as the amount of charge that will likely accumulate in the center floating diffusion region 250b is sufficiently small that the capacity of the floating diffusion region 250b is sufficiently small to store the charge and reach a high-level of voltage sensitivity until the next time the amount of charge is read, e.g., voltage increases easily with smaller amount of electron. However, in a bright setting, one or both bridges 252a,b may be enabled as the center floating diffusion region 250b may quickly reach full capacity, or saturation, due to the large number of photons reaching the sensor, thereby causing a faster accumulation of charge in the floating diffusion region 250b than the capacity of the floating diffusion region in an un-binned setting.

It should be noted that while the image sensor 200 shown in FIGS. 2A-2C only includes two sensor elements, example image sensors according to this disclosure may include many more sensor elements. For example, some image sensors 200 according to this disclosure may include hundreds, thousands, or millions of sensor elements arranged in any suitable arrangement, including two-dimensional arrays. In one example, an image sensor may include a number of sensor elements arranged in a two dimensional array having 1024 sensor elements per row and having 768 rows. However, still other arrangements and numbers of sensor elements may be employed.

Further, bridges may be incorporated into one or more example sensors according to any predetermined arrangement that may be desired. For example, each sensor element may be coupled by a bridge to every other adjacent sensor element in one example, In another example, each sensor element may be coupled by bridges to adjacent sensor elements in the same row or column. Further, while the example shown in FIG. 2 shows only that the center floating diffusion region 250b is coupled to two floating diffusion regions 250a,c that are immediately adjacent to it, in some examples, a first floating diffusion region may be coupled by a bridge to an adjacent, second floating diffusion region, which in turn may be coupled to a third floating diffusion region that is adjacent to the second floating diffusion region, but is not adjacent to the first floating diffusion region, such that the accumulation of charge in the first floating diffusion region traverses the bridge to the second floating diffusion region and then to the third floating diffusion region. Still further configurations may be possible in different examples.

Bridges 252a-c may be employed in different examples of dynamic pixel binning to provide increased apparent floating diffusion capacity as discussed above; however, some examples according to this disclosure may not employ bridges.

Figure 3:
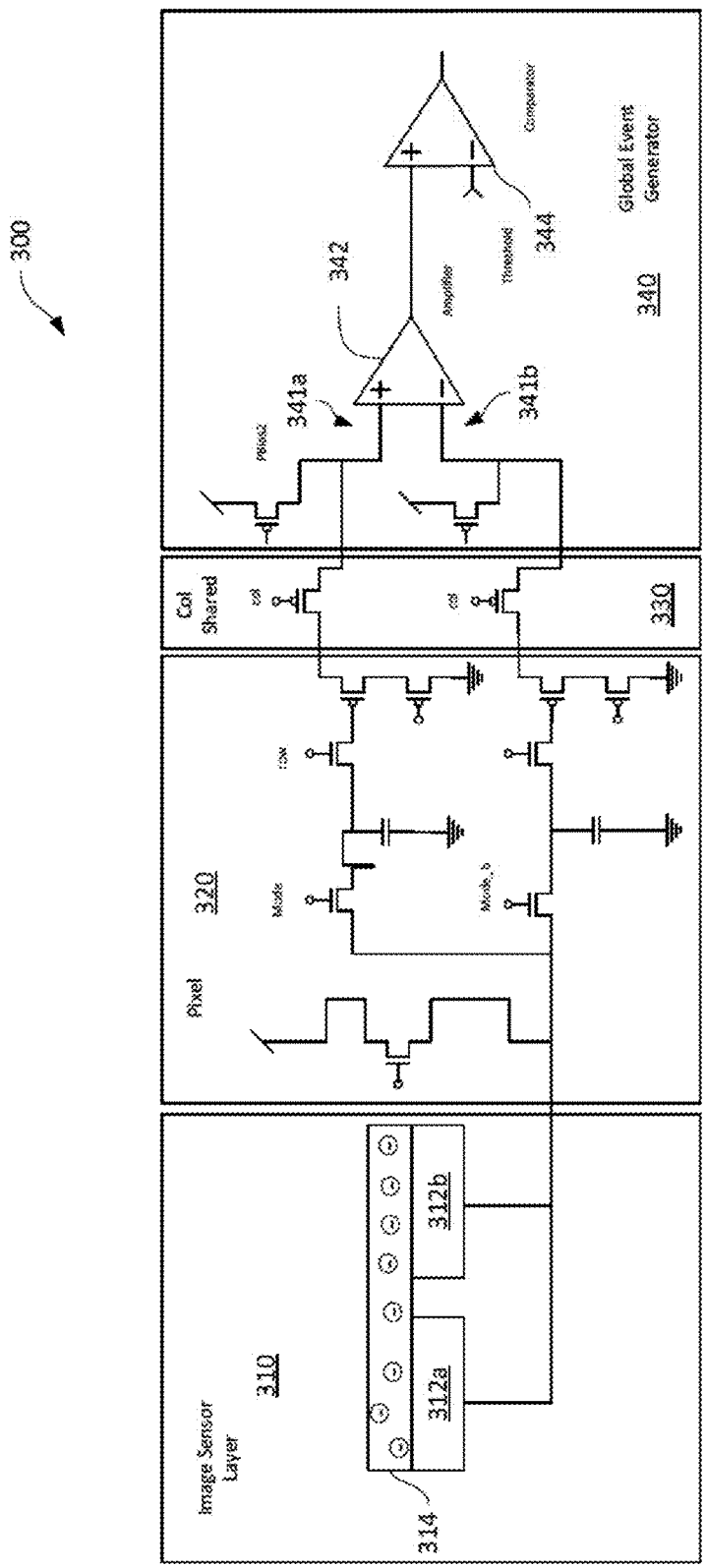
FIG. 3 shows an example image sensor with dynamic pixel binning.

Referring now to FIG. 3, FIG. 3 shows an example sensor system 300 with dynamic pixel binning. The sensor system 300 includes an image sensor layer 310, a pixel select layer 320, a column select layer 330, and a global event generator layer 340 or analog signal comparator. The image sensor layer 310 in the example employs a photo-sensitive layer 314, such as an OPF laminated CMOS sensor shown in FIGS. 2A-2C, though other suitable layered film technology may be employed, including QDF laminated CMOS image sensors. The image sensor layer 310 is configured to employ interleaved pixel-binning such that floating diffusion regions 312a and 312b of two neighboring pixel elements alternately accumulate charges that can be read out each frame period. The pixel select layer 320 and column select layers 330 provide the ability to select individual binned pixel outputs from the image sensor layer 310 for analysis.

In a motion detection operation, the global event generator layer 340 determines whether the values read, or analog voltage sampled from the floating diffusion regions 312a,b of the binned pixel elements differ by more than a predetermined threshold to trigger an output via the comparator 344, indicating a change detected at this pixel element. The use of a threshold, e.g., hysteresis, may avoid undesired output disturbance due to noise inside the pixel circuit. The two output signals from the image sensor layer 310 corresponding to the floating diffusion regions 312a,b of the same binned pixel elements are communicated to the differential amplifier 342, which amplifies the difference, e.g., an AC signal difference, between the two output signals received at the amplifier's inputs 341a-b. The output of the differential amplifier 342 is communicated to the comparator 344, which compares the output with a predetermined threshold signal to determine whether the detected difference between the two signals is sufficiently large. If so, the comparator 344 outputs a signal to indicate a significant change in pixel value between two frames, e.g., a digital "1" signal, or a signal to indicate no significant change in value, e.g., a digital "0" signal. In this example, a "significant change" occurs when the output of the differential amplifier 342 exceeds the threshold value input to the comparator 344. In one example, a processor may use the detected change to detect motion occurring in a scene captured by the camera and capture a contour of a moving object. Further, in examples of image sensors that include a significant number of pixels, e.g., thousands or millions of pixels, detection of motion may be further dependent on a threshold number of pixels indicating a change across successive frames before the processor determines that motion has been detected.

Some implementations of the sensor system 300 of FIG. 3 and the image sensor 200 of FIGS. 2A-2C allow for reduced power consumption, and in some cases, may do so without sacrificing spatial coverage. Binning can reduce power consumption as the number of floating diffusion regions decreases, and therefore, the number of the signals from sensor's pixel array decreases and analog-to-digital conversion frequency may be reduced as well. However, the effective resolution of the image sensor 200 is reduced by combining the outputs of multiple sensor elements into a single output. Further, by employing interleaved binning, motion detection can be performed with relatively simple, efficient circuitry as shown in FIG. 3, rather than more complex software algorithms and processor utilization outside of the silicon device, which may avoid power usage due to communication of data off of the silicon device. In addition, the pixel element implementation in some examples may be smaller because photodetector and signal processing circuit are created in 3-dimensions, rather than, for example, incorporating one or more extra capacitors per pixel in a planar silicon wafer, resulting in lower photodetector fill-factor and lower photo-sensitivity.

Figure 4:
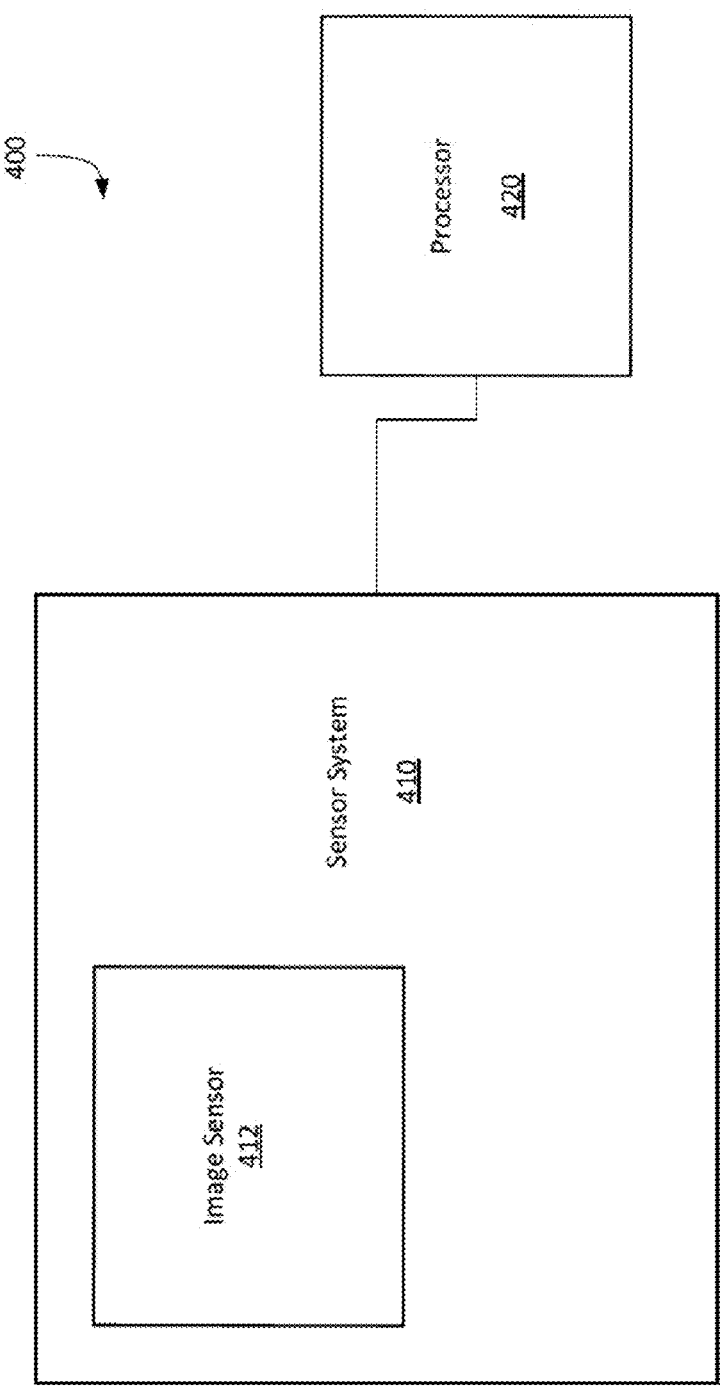
FIG. 4 shows an example system for dynamic pixel binning.

Referring now to FIG. 4, FIG. 4 shows an example system 400 having an image sensor with dynamic pixel binning. The system 400 includes a processor 420 in communication with a sensor system 410. The sensor system 410 includes an image sensor 412, such as the image sensor 200 shown in FIG. 2. The processor 420 is configured to transmit signals to the sensor system 410 to enable or disable the sensor system 410, to change a sensing mode of the sensor system 410, or to initiate a capture of one or more images. The sensor system 410 is configured to receive signals from the processor 420 and to control the image sensor 412.

In this example, the sensor system 410 is configured to enable, disable, or interleave pixel binning in the image sensor 412. The sensor system 410 is further configured to receive one or more sensor signals from the image sensor 412 associated with readings of accumulated charges related to light-intensities on the pixel elements and within various floating diffusion regions within the image sensor 412, and to provide sensor information to the processor 420. The processor 420 may be incorporated into the digital circuit implementation on the same silicon device as the image sensor system. For example, sensor information may include charge information, such as the detected charge in some or all of the floating diffusion regions of the image sensor 412, pixel information based on charge information or light intensity of the pixel elements read from the image sensor 412, a signal indicating whether motion was detected or not, or other information. In some examples, the sensor system 410 further includes circuitry, such as the circuitry shown in FIG. 3, configured to determine differences in pixel readings over successive frames and provide one or more signals indicating such differences to the processor 420. For example, the sensor system 410 may output a two-color image, e.g., black and white, based on the output of the sensor system. Pixels for which no significant change in pixel value in successive frames are represented as black in the two-color image, while pixels for which a significant change in pixel value was detected in successive frames are represented as white. Thus, a processor analyzing such an image may be able to quickly identify moving objects in a scene.

It should be appreciated that any example image sensor according to this disclose may be suitable for use as image sensor 412 in the example shown in FIG. 4. For example, any of the example image sensors shown in FIG. 2A-H, 3, or 8-10 may be suitable employed according to various examples. Further, it should be appreciated that various implementation options may be available in accordance with specific requirements in applications. For example, a customized hardware in the same wafer or die of the silicon sensor might also be used, or particular elements might be implemented in customized hardware, software or both, to replace the processor in the FIG. 4.

Figure 5:
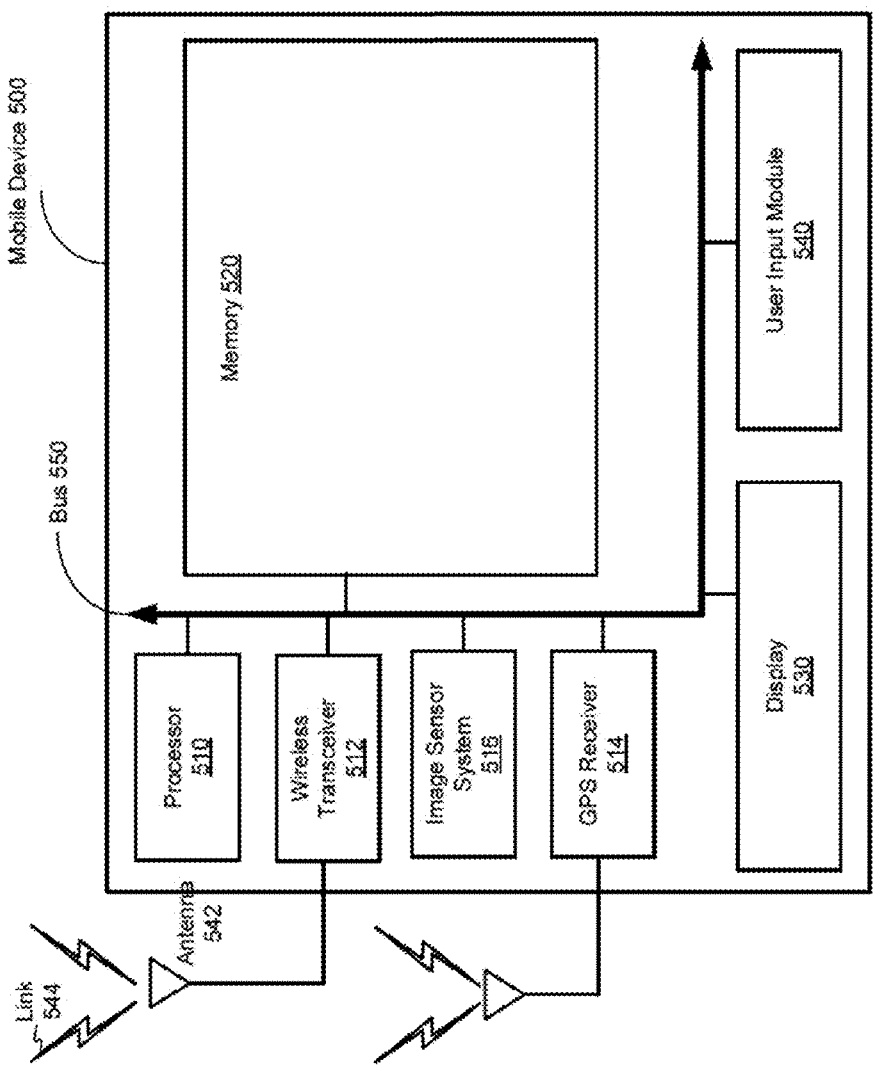
FIG. 5 shows an example mobile wireless device including an image sensor with dynamic pixel binning.

Referring now to FIG. 5, FIG. 5 shows an example mobile device 500. In the example shown in FIG. 5, the mobile device includes a processor 510, a memory 520, a wireless transceiver 512, a Global Navigation Satellite System, e.g., Global Positioning System (GPS), receiver 514, an image sensor system 516, a display 530, a user input device 540, and a bus 550. In this example, the mobile device comprises a cellular smartphone, but may be any suitable device, include a cellular phone, a laptop computer, a tablet, a phablet, a personal digital assistant (PDA), wearable device, or augmented reality device. The processor 510 is configured to employ bus 550 to execute program code stored in memory 520, to output display signals to a display 530, and to receive input from the user input device 540. Suitable user input devices 540 may include touch-sensitive input devices, such as touch screens or touch pads; buttons; D-pads; sliders; keyboards or keypads; etc.

In addition, the processor 510 is configured to receive information from the GPS receiver 514 and wireless transceiver 512 and to transmit information to the wireless transceiver 512.

In this example, the processor 510 comprises a computer-readable medium, such as a random access memory (RAM) coupled to the processor. The processor 510 executes computer-executable program instructions stored in memory 520. Suitable example processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices. Processor is used herein according to its structural meaning, and not to denote software per se. The processor may include on-board memory, and may execute instructions stored in on-board memory, a separate memory, or a combination.

Example devices according to this disclosure that employ processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The wireless transceiver 512 is configured to transmit and receive wireless signals via antenna 542 using link 544. For example, the wireless transceiver may be configured to communicate with a cellular base station by transmitting signals to and receiving signals from an antenna associated with the cellular base station. The GPS receiver 514 is configured to receive signals from one or more GPS satellites and to provide location signals to the processor 510. In this example, the image sensor system 516 comprises an image sensor system, such as the sensor systems 300, 410 shown in FIGS. 3 and 4; however, the image sensor system 516 may be any suitable image sensor system. In this example, the mobile device 500 is configured to perform motion detection using the image sensor system 516 and pixel-binning as described herein.

Figure 6:
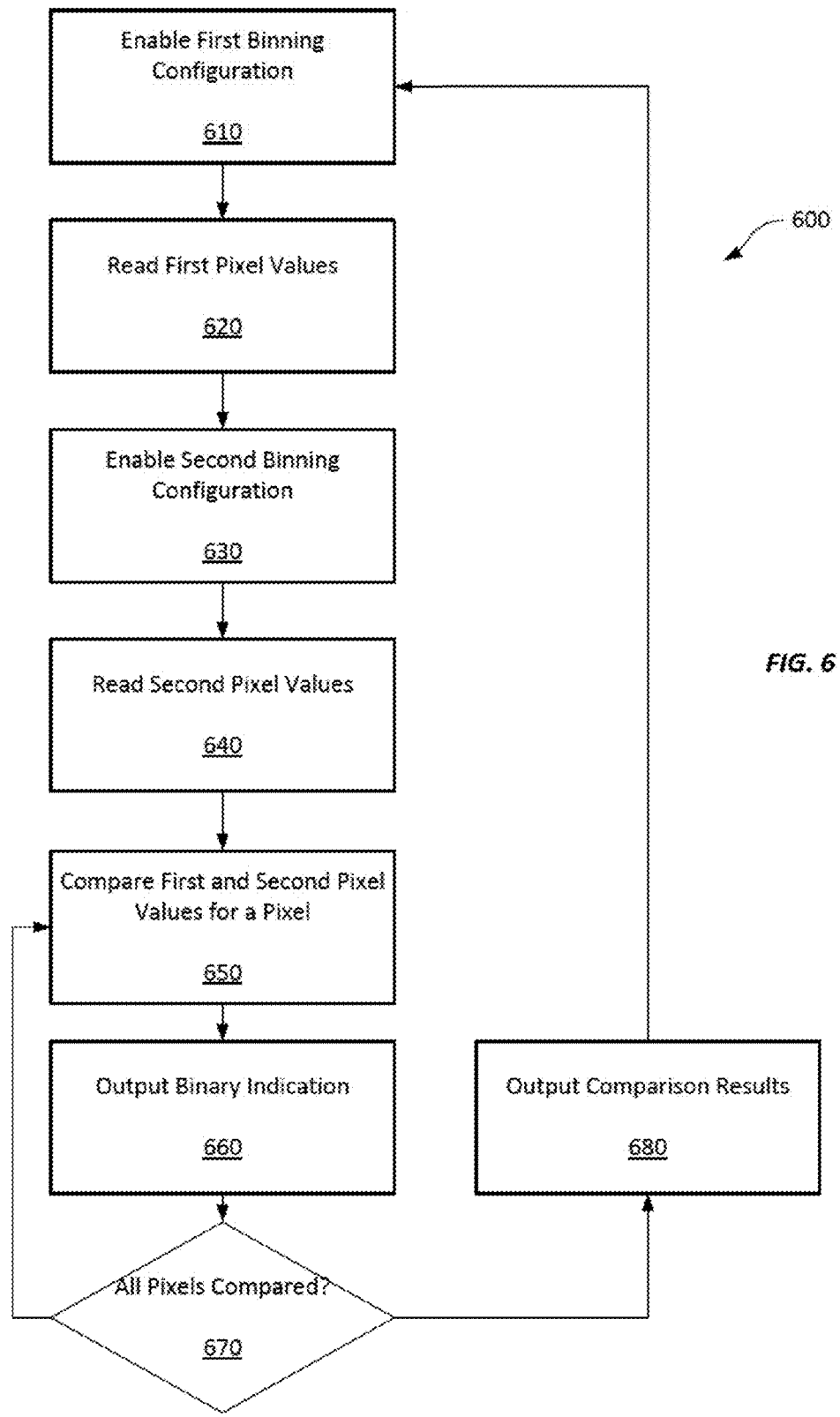
FIG. 6 shows an example method for dynamic pixel binning.

Referring now to FIG. 6, FIG. 6 shows an example method. The method of FIG. 6 will be discussed with respect to the system 400 shown in FIG. 4, but is not limited to execution by such a system. Rather any suitable system according to this disclosure may be employed. Further, it should be noted that while the method description below is described sequentially, one or more steps may be performed simultaneously, substantially simultaneously, or in different orders, in different examples according to this disclosure. The method 600 of FIG. 6 begins at block 610.

Figure 7A:
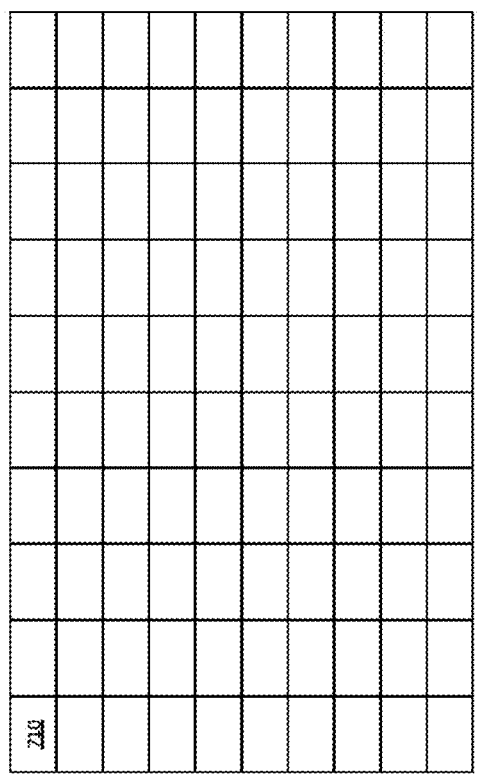
FIGS. 7A and 7B show an example of pixel binning.
Figure 7B:
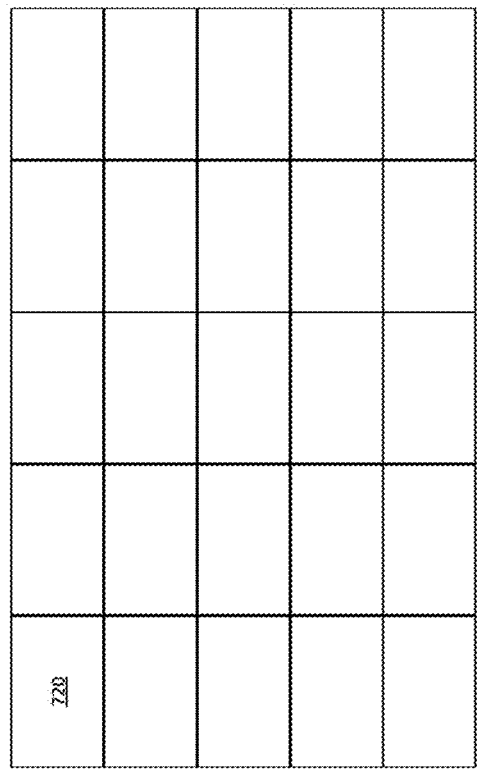

At block 610, the processor 420 transmits a signal to the sensor system 410 to configure pixel binning according to a first configuration. In this example, the image sensor 412 includes a two-dimensional array of sensor elements and the first binning configuration generates a binning configuration dividing the two-dimensional array into a two-dimensional array of pixel elements having four adjacent pixels sharing a single floating diffusion region. For example, FIG. 7A illustrates a two-dimensional array of sensor elements 710, and FIG. 7B illustrates the same array, however, the sensor elements 710 have been binned to create larger pixels 720. Each larger pixel 720 corresponding to four sensor elements 710.

At block 620, the sensor system 410 reads a first set of pixel values from the respective floating diffusion regions of the binned pixel elements, where the first set of binned pixel values corresponds to a first frame. The values from the first set of binned pixel values are then stored by the sensor system.

At block 630, the processor 420 transmits a second signal to the sensor system 410 to configure pixel binning according to a second configuration. As discussed above with respect to block 610, the two-dimensional array of pixel elements are binned to create larger pixels 720 corresponding to four adjacent sensor elements 710 as shown in FIG. 7B. The second configuration creates the same arrangement of pixels 720 from the same corresponding sensor elements 710, however, a different floating diffusion area is selected as the common floating diffusion area for each larger pixel 720. As a result, if pixel elements A and B are binned together at block 610, they remain binned together at block 630. Thus, the pixel-binning maintains the same pixel element configuration for both pixel-binning configurations.

At block 640, the sensor system 410 reads a second set of pixel values from the respective floating diffusion regions of the binned pixel elements, where the second set of binned pixel values corresponds to a second frame. The values from the second set of pixel values are then stored by the sensor system 410.

At block 650, the sensor system 410 compares pixel values from the first and second sets of pixel values corresponding to the same pixel 720, but from the two different frames. Thus, a particular pixel's value in the first frame is compared to the same pixel's value in the second frame. The difference between the respective values is then compared against a threshold value.

At block 660, the sensor system 410 outputs an indication of whether the difference is greater than the threshold. In this example, if the determined difference is greater than the threshold, the sensor system 410 outputs a binary '1' for the pixel, otherwise the sensor system 410 outputs a binary '0' for the pixel.

At block 670, the sensor system 410 determines whether all pixels have had their respective values compared. If not, the method 600 returns to block 650, otherwise the method 600 proceeds to block 680.

At block 680, the sensor system 410 outputs the results of the comparisons of the respective pixel values. In this example, the sensor system 410 outputs an image having black pixels corresponding to binary '0' based on the comparisons and white values corresponding to binary '1' based on the comparisons. In some examples, the summation of the comparison results of the sensor frame may be a contour of moving objects. However, in some examples, the sensor system 410 determines whether the number of binary '1' values exceeds a second threshold, e.g., by incrementing a counter for each binary '1', and outputs a binary '0' if the second threshold is not exceeded, or a binary '1' if the second threshold is exceeded. In this example, the sensor system 410 outputs the results of the comparisons to the processor 420, which then determines whether motion has been detected based on the received results or may output a contour of one or more moving objects.

While the method 600 of FIG. 6 discussed above includes blocks related to comparing pixel values, in some examples, the method of FIG. 6 concludes after block 640, without performing any comparisons, and instead may output one or more image frames based on pixel values read from the image sensor 412.

Figure 8:
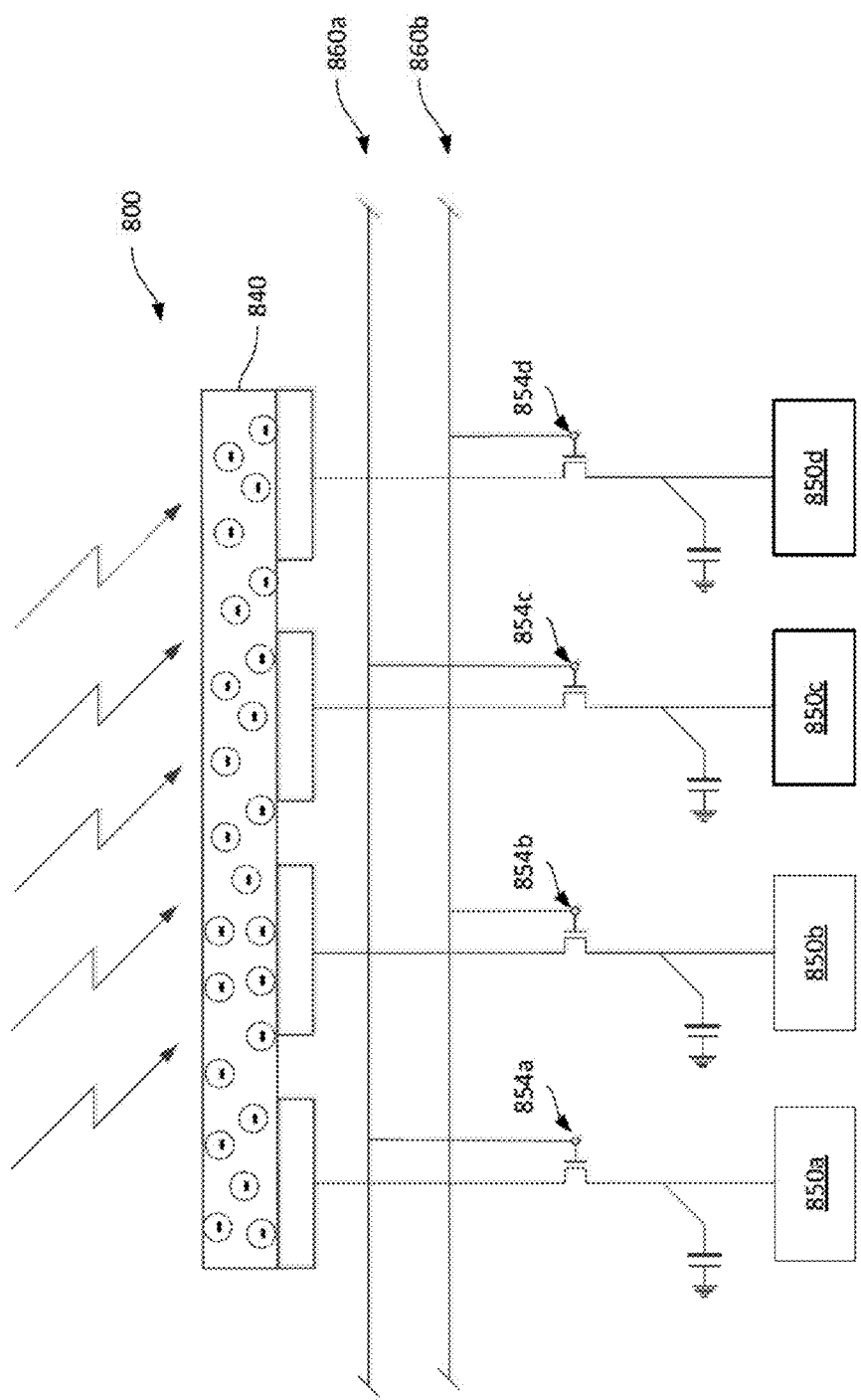
FIGS. 8-10 show example image sensors with dynamic pixel binning.

Referring now to FIG. 8, FIG. 8 shows an example image sensor 800. In the example shown in FIG. 8, the image sensor 800 comprises a photo-sensitive layer 840, a plurality of transistors 854*a-d*, a plurality of floating diffusion regions 850*a-d*, and two "enable" lines 860*a-b*. In this example, each floating diffusion region 850*a-d* is configured to be enabled by one of the two "enable" lines 860*a-b*. For example, floating diffusion region 850*a* may be selectively enabled by line 860*a*. However, because multiple floating diffusion regions are coupled to the same "enable" line, multiple floating diffusion regions may be simultaneously enabled or disabled. Thus each floating diffusion region 850*a-d* may be thought of as being part of one of two groups of floating diffusion regions. For example, one group of floating diffusion regions may include all floating diffusion regions coupled to "enable" line 860*a*, while another group of floating diffusion regions may include all floating diffusion regions coupled to "enable" line 860*b*. Thus, each group of floating diffusion regions may be collectively enabled or disabled by changing a state of one of the "enable" lines 860*a-b*.

Such an arrangement may enable efficient interleaving of floating diffusion regions across the entire sensor 800, or across portions of the sensor 800 (e.g., per column or per row). For example, in a first frame period, one "enable" line may be enabled, while the other may be disabled, and in the next frame period, each "enable" line may be toggled. For successive frames, all floating diffusion regions in the sensor 800 (or a portion of the sensor 800) may be alternately toggled simply by toggling the state of the two "enable" lines 860*a-b*. However, to enable use of all floating diffusion regions, both "enable" lines 860*a-b* may be enabled, or they may both be disabled to disable the image sensor. Such "enable" lines may be referred to as "global enable" lines to indicate that multiple floating diffusion regions are coupled to the same "enable" line.

Figure 9:
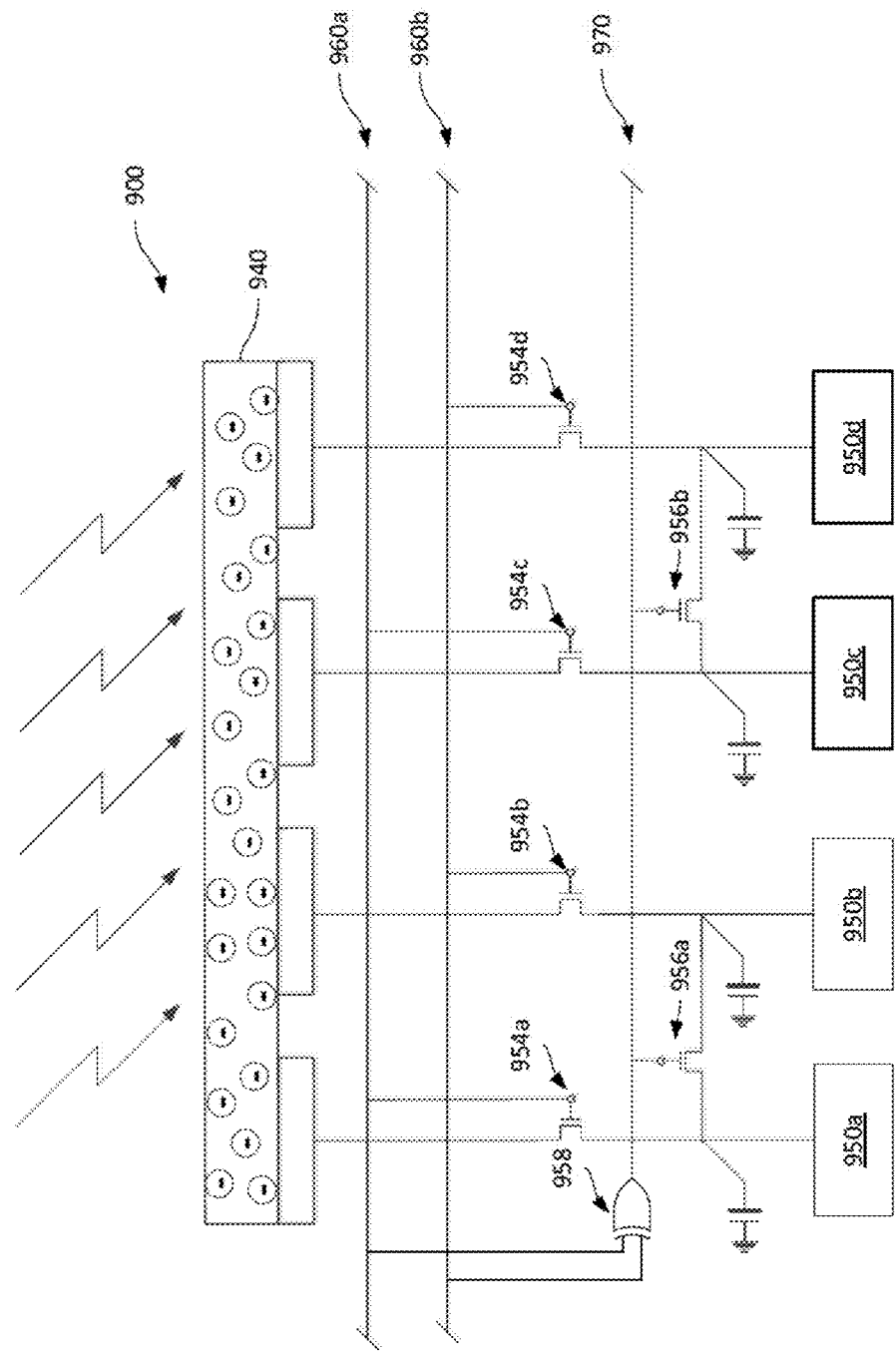

Referring to FIG. 9, FIG. 9 shows an example image sensor 900. The image sensor 900 of FIG. 9 is similar to the image sensor 800 of FIG. 8 because the image sensor 900 of FIG. 9 also employs two global "enable" lines 960*a-b*, which operate as described above with respect to FIG. 8. In addition, the image sensor 900 includes bridges 956*a-b* between pairs of floating diffusion regions. In this example, each floating diffusion region 950*a-d* is coupled to only one bridge, and each bridge is coupled to only two floating diffusion regions. Further, each bridge is enabled or disabled based on the output of an XOR gate 958. In this case, however, the XOR gate provides a global "bridge enable" signal because the output of the XOR gate is coupled to multiple bridges 956*a-b*. Further, the inputs of the XOR gate are coupled to the two global "enable" lines 960*a-b*. Thus, while the two "enable" lines have different states, the XOR gate may output a "bridge enable" signal to enable the bridges 956*a-b*. However, if all floating diffusion regions 950*a-d* are enabled (or all are disabled), the bridges 956*a-b* are disabled. Such an arrangement may allow for efficient bridging only during times when pixel binning is employed. It should be noted that rather than directly providing the signals from the "enable" lines to the XOR gate, that may be first routed to other logic, along with a third input signal, which may be used to select whether bridging should be enabled during pixel binning operations.

Figure 10:
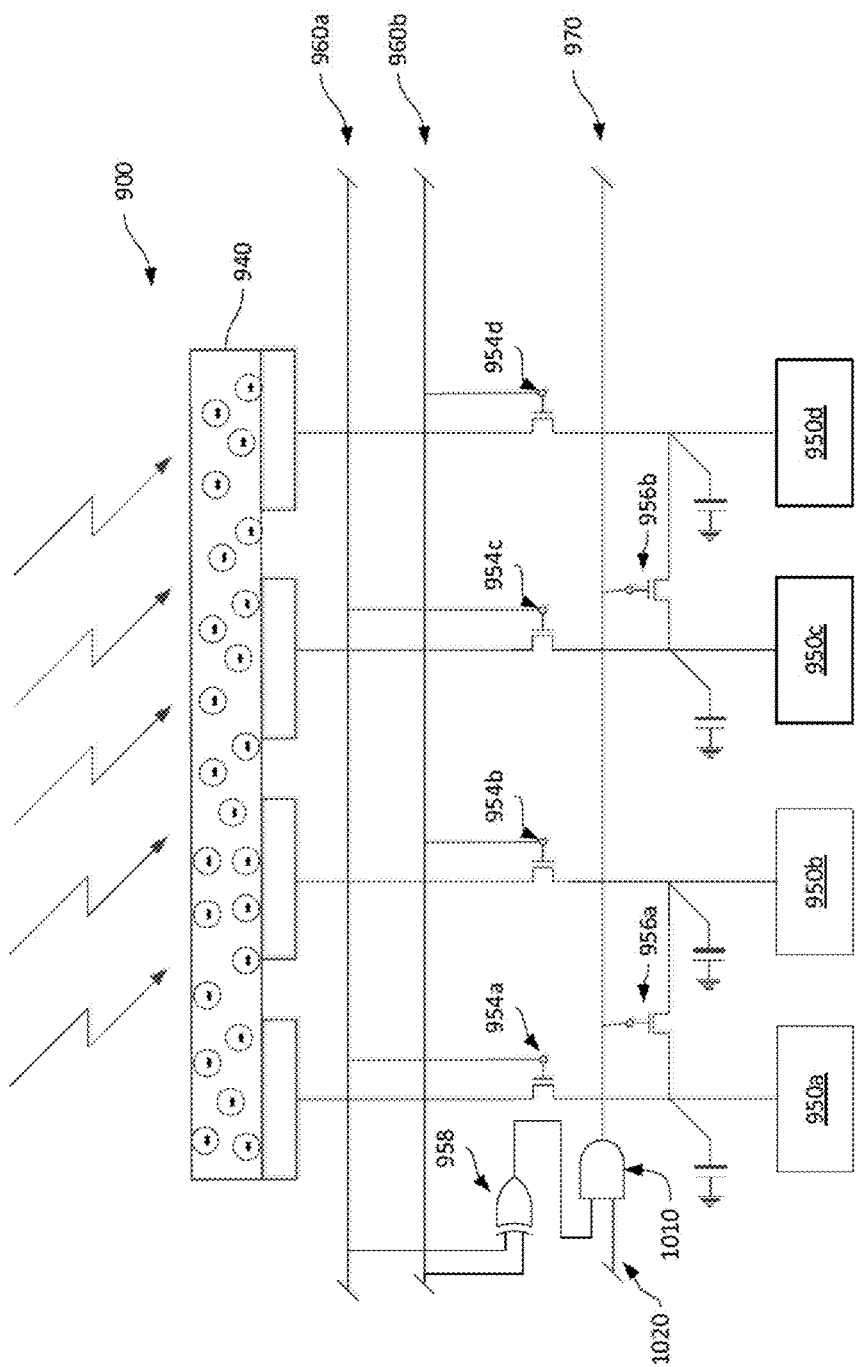

For example, as is shown in FIG. 10, the two enable lines 960*a-b* may be routed to the XOR gate 958, whose output is routed to an AND (or NAND) gate 1010, rather than directly to the bridges 956*a-b*. A second input to the AND gate may be a control signal 1020 configured to enable or disable bridging, irrespective of a pixel binning operation, and output of the AND gate 1010 may be routed to the bridges 956*a-b*. For example, if the control signal 1020 is set to disable bridging, the output of the AND gate 1010 will disable bridging, even if the two "enable" lines 960*a-b* are configured to enable pixel binning (i.e., they have different states) and the output of the XOR gate 958 would otherwise enable bridging.

Figure 11:
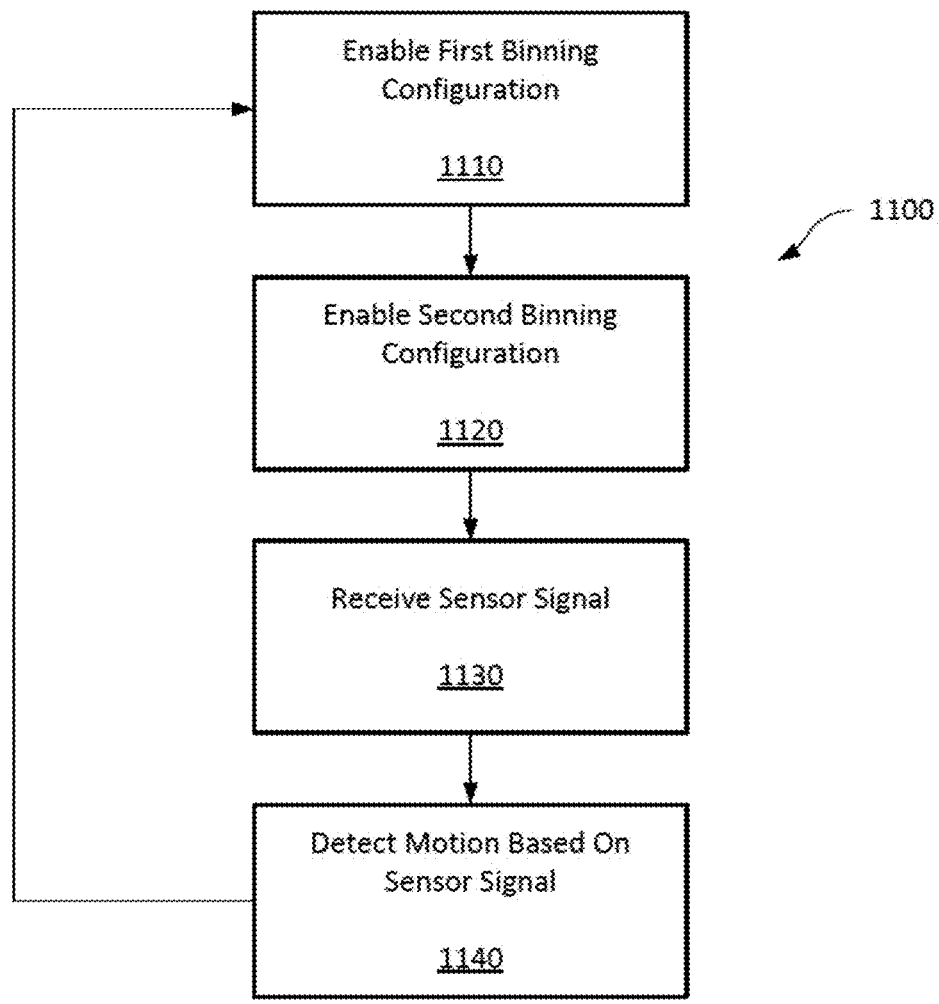
FIG. 11 shows an example method for dynamic pixel binning.

Referring now to FIG. 11, FIG. 11 shows an example method for pixel binning. The method of FIG. 11 will be discussed with respect to the system 400 shown in FIG. 4, but is not limited to execution by such a system. Rather any suitable system according to this disclosure may be employed. Further, it should be noted that while the method description below is described sequentially, one or more steps may be performed simultaneously, substantially simultaneously, or in different orders, in different examples according to this disclosure. The method 1100 of FIG. 11 begins at block 1110.

At block 1110, the processor 420 transmits a signal to the sensor system 410 to enable a first binning configuration. For example, the processor 420 may transmit a signal selecting a first binning configuration to enable a first plurality of floating diffusion regions and to disable a second plurality of floating diffusion regions. However, in some examples, the processor 420 may send separate signals to enable the second plurality of floating diffusion regions and to disable the first plurality of floating diffusion regions. Further, in some examples, the processor 420 may individually select floating diffusion regions to enable or disable, while in other examples, the processor 420 may transmit a signal indicating a predetermined group of floating diffusion regions to enable or disable. In this example, the processor 420 transmits the signal at, or prior to, a first frame period.

At block 1120, the processor 420 transmits a signal to the sensor system 410 to enable a second binning configuration, where the second binning configuration is different from the first binning configuration. Such a signal may be transmitted as discussed above with respect to block 1110. In this example, the second binning configured to enable the second plurality of floating diffusion regions and disable the first plurality of floating diffusion regions. However, in some examples, the processor 420 may send separate signals to enable the second plurality of floating diffusion regions and to disable the first plurality of floating diffusion regions. Further, in some examples, the processor 420 may individually select floating diffusion regions to enable or disable, while in other examples, the processor 420 may transmit a signal indicating a predetermined group of floating diffusion regions to enable or disable.

In this example, the different groups of floating diffusion regions, while including different floating diffusion regions, maintain the same pixel-binning configuration, meaning that if pixel elements A and B are binned together at block 1110, they remain binned together at block 1120. Thus, the pixel binning maintains the same pixel element configuration for both pixel binning configurations.

At block 1130, the processor 420 receives a sensor signal from the sensor system 410, the sensor signal including comparison values based on the comparison signals. As discussed above with respect to various sensors, outputs from floating diffusion regions may be compared to determine if a significant change in pixel intensity has occurred between two successive frame periods. If a significant change is detected, one value may be output, while if no significant change is detected, another value may be output.

In this example, the sensor signal includes a two-color image, where a first color corresponds to a comparison value indicating no significant change in a pixel value from the first frame period to the second frame period, and a second color corresponds to a comparison value indicating a significant change in a pixel value from the first frame period to the second frame period. For example the colors may be black and white, where black indicates no significant change has occurred and white indicates significant change has occurred. Thus, the sensor signal includes a black-and-white image indicating where changes in intensity were detected.

At block 1140, the processor 420 determines whether motion was detected based on the sensor signal. In this example, the sensor signal comprises a black-and-white image as discussed above, and the processor 420 determines whether motion was detected based on a size of a contiguous number of white pixels in the image. If a number of contiguous white pixels exceeds a threshold, the processor 420 determines that motion was detected. In some examples, if no single contiguous grouping of white pixels exceeds the threshold, but two or more contiguous groups of white pixels of a minimum size exceeds the threshold, the processor 420 may detect motion has occurred.

After completing block 1140, the method 1100 may return to block 1110 for another iteration of the method 1100, or the method 1100 may terminate.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. An image sensor system, comprising:
    a plurality of sensor elements;
    a plurality of floating diffusion regions in communication with the plurality of sensor elements, each floating diffusion region of the plurality of floating diffusion regions configured to be selectively enabled,
    wherein a first sensor element has a corresponding first floating diffusion region and a second sensor element has a corresponding second floating diffusion region, and wherein:
        a first configuration of the image sensor system comprises the first and second sensor element binned with the first floating diffusion region, and the second floating diffusion region disabled, and
        a second configuration of the image sensor system comprises the first and second sensor element binned with the second floating diffusion region, and the first floating diffusion region disabled; and further comprising:
    a bridge coupled between the first and second floating diffusion regions, the bridge configured to be selectively enabled in the first and second configurations, and, when enabled, to allow a transfer of charge between the first and second floating diffusion regions, wherein the bridge is enabled in the first and second configurations; and
    at least one comparison circuit coupled to the first and second floating diffusion regions, the comparison circuit configured to:
        receive input signals from the first and second floating diffusion regions, compare the input signals, and output a comparison signal based on the comparison of the input signals.

2. The image sensor system of claim 1, wherein the comparison circuit comprises a differential amplifier, wherein a first input of the differential amplifier is coupled to an output of a first of the two floating diffusion regions, a second input of the differential amplifier is coupled to an output of a second of the two floating diffusion regions.

3. The image sensor system of claim 2, wherein the differential amplifier is configured to provide the comparison signal.

4. The image sensor system of claim 2, wherein the comparison circuit further comprises a comparator, and wherein the output of the differential amplifier is coupled to a first input of the comparator, and wherein a reference signal source is coupled to the second input of the comparator, and wherein the comparator is configured to provide the comparison signal based on a comparison of the output of the differential amplifier and a reference signal transmitted by the reference signal source.

5. The image sensor system of claim 1, wherein the plurality of sensor elements corresponds to a plurality of pixels arranged in rows and columns, each pixel including a lens to receive incident light, each lens in optical communication with a photo-sensitive layer, the photo-sensitive layer configured to generate electrons in response to photons striking the photo-sensitive layer, wherein each sensor element of each pixel is associated with one of the floating diffusion regions of the plurality of floating diffusion regions.

6. The image sensor system of claim 1, further comprising a plurality of bridges, each of the bridges coupled between two floating diffusion regions of the plurality of floating diffusion regions, each of the bridges configured to be individually selectively enabled and, when enabled, to allow a transfer of charge between the two floating diffusion regions.

7. The image sensor system of claim 6, wherein no floating diffusion region is coupled to more than one bridge.

8. The image sensor system of claim 7, further comprising an exclusive-OR ("XOR") gate coupled to the bridge, the XOR gate configured to receive first and second enable signals associated with the two floating diffusion regions, the XOR gate configured to:
    enable the bridge when only one of the two floating diffusion regions is enabled, and
    disable the bridge when both of the two floating diffusion regions are enabled or disabled.

9. The image sensor system of claim 1, further comprising a processor, the processor configured to receive the comparison signal and detect motion based on the received comparison signal.

10. A method for dynamic pixel binning comprising:
    enabling a first binning configuration in an image sensor system to establish a first pixel configuration using a first floating diffusion region, the first pixel configuration comprising a plurality of sensor elements and a corresponding plurality of floating diffusion regions, wherein each sensor element of the plurality of sensor elements each has a corresponding floating diffusion region of the plurality of floating diffusion regions, wherein the plurality of floating diffusion regions comprises the first floating diffusion region and a second floating diffusion region;

enabling a bridge coupled between the first floating diffusion region and the second floating diffusion region, the bridge configured to be selectively enabled, and, when enabled, to allow a transfer of charge between the first and second floating diffusion regions;

reading a first pixel value from the bridged first and second floating diffusion region;

enabling a second binning configuration in the image sensor system, the second binning configuration maintaining the first pixel configuration using the second floating diffusion region corresponding to a second sensor element of the plurality of sensor elements, the second floating diffusion region different from the first floating diffusion region;

reading a second pixel value from the bridged first and second floating diffusion region, comparing the first and second pixel values, and outputting a comparison signal indicating a result of the comparing.

11. The method of claim 10, wherein:
enabling the first binning configuration comprises:
enabling the first floating diffusion region, and
disabling the second floating diffusion region, and
enabling the second binning configuration comprises:
enabling the second floating diffusion region, and
disabling the first floating diffusion region.

12. The method of claim 10, wherein enabling the bridge comprises:
receiving first and second enable signals, the first and second enable signals configured to selectively enable the first and second floating diffusion regions, respectively;
performing an exclusive-OR operation based on the first and second enable signals; and
outputting an exclusive-OR signal to the bridge, the exclusive-OR signal configured to enable the bridge when only one of the first or second enable signals enables the respective first and second floating diffusion regions, and disable the bridge when both of the first and second enable signals enable or disable the respective first and second floating diffusion regions.

13. The method of claim 10, wherein comparing the first and second pixel values comprises providing the first and second pixel values to first and second inputs of a differential amplifier.

14. The method of claim 13, wherein outputting the comparison signal comprises transmitting an output signal from the differential amplifier.

15. The method of claim 13, wherein comparing the first and second pixel values further comprises:
transmitting an output signal from the differential amplifier to a first input of a comparator;
transmitting a reference signal to a second input of the comparator; and
outputting the comparison signal comprising transmitting an output signal from the comparator, the output signal from the comparator based on the output signal from the differential amplifier and the reference signal.

16. An image sensor system, comprising:
a two-dimensional array of pixel elements;
a plurality of floating diffusion regions, each floating diffusion region corresponding to different one of the pixel elements, each floating diffusion region configured to be individually and selectively enabled, and wherein, for a first sensor element and a corresponding first floating diffusion region and a second sensor element and a corresponding second floating diffusion region:
a first configuration of the image sensor system comprises the first and second sensor element binned with the first floating diffusion region, and the second floating diffusion region disabled, and
a second configuration of the image sensor system comprises the first and second sensor element binned with the second floating diffusion region, and the first floating diffusion region disabled; and further comprising:
a plurality of bridges, each bridge coupled between two floating diffusion regions of the plurality of floating diffusion regions, each bridge configured to be selectively enabled in the first and second configurations, and, when enabled, to allow a transfer of charge between the two floating diffusion regions; and
a plurality of comparison circuits, each comparison circuit coupled to an output of two floating diffusion regions and a first comparison circuit of the plurality of comparison circuits coupled to the first and second floating diffusion regions, wherein no floating diffusion region is coupled to two comparison circuits, each of the comparison circuits configured to:
receive input signals from the respective two floating diffusion regions,
compare the input signals, and
output a comparison signal based on the comparison of the input signals.

17. The image sensor system of claim 16, wherein each comparison circuit comprises a differential amplifier, wherein a first input of the differential amplifier is coupled to an output of a first of the respective two floating diffusion regions, a second input of the differential amplifier is coupled to an output of a second of the respective two floating diffusion regions.

18. The image sensor system of claim 17, wherein the differential amplifier is configured to provide the comparison signal.

19. The image sensor system of claim 17, wherein each comparison circuit further comprises a comparator, and wherein the output of the differential amplifier is coupled to a first input of the comparator, and wherein a reference signal source is coupled to the second input of the comparator, and wherein the comparator is configured to provide the comparison signal based on a comparison of the output of the differential amplifier and a reference signal transmitted by the reference signal source.

20. The image sensor system of claim 16, wherein no floating diffusion region is coupled to more than one bridge.

21. The image sensor system of claim 16, further comprising a plurality of exclusive-OR ("XOR") gates, each XOR gate coupled to one bridge of the plurality of bridges, each XOR gate configured to receive first and second enable signals associated with the two floating diffusion regions, the XOR gate configured to:
enable the bridge when only one of the two floating diffusion regions is enabled, and
disable the bridge when both of the two floating diffusion regions are enabled or disabled.

22. The image sensor system of claim 16, wherein each floating diffusion region is associated with one of a first group or second group of floating diffusion regions, wherein floating diffusion regions of the first group are configured to be enabled simultaneously by a common first enable signal, and floating diffusion regions of the second group are configured to be enabled simultaneously by a common second enable signal, and further comprising an exclusive-OR ("XOR") gate, an output of the XOR gate coupled to each of the bridges, inputs of the XOR gate configured to receive the first and second common enable signals, the XOR gate configured to:
  enable the bridges when only one of the common first or second enable signals is enabled, and
  disable the bridges when both of the common first and second enable signals are enabled or disabled.

23. The image sensor system of claim 16, further comprising a processor configured to receive the comparison signal and detect motion based on the received comparison signal.

24. A method of detecting motion in an image sensing system, the method comprising:
  transmitting a first enable signal to an image sensor system during a first frame period, the image sensor system comprising:
    a two-dimensional array of pixel elements;
    a plurality of floating diffusion regions, each floating diffusion region corresponding to different one of the pixel elements, each floating diffusion region configured to be individually and selectively enabled,
    a plurality of bridges, each bridge coupled between two floating diffusion regions of the plurality of floating diffusion regions, each bridge configured to be selectively enabled and, when enabled, to allow a transfer of charge between the two floating diffusion regions, and wherein a first sensor element has a corresponding first floating diffusion region and a second sensor element has a corresponding second floating diffusion region, and wherein:
      a first configuration of the image sensor system comprises the first and second sensor element binned with the first floating diffusion region, and the second floating diffusion region disabled,
      a second configuration of the image sensor system comprises the first and second sensor element binned with the second floating diffusion region, and the first floating diffusion region disabled, and
    wherein a first bridge of the plurality of bridges coupled between the first and second floating diffusion regions is enabled in the first and second configuration;
  a plurality of comparison circuits, each comparison circuit coupled to an output of two floating diffusion regions and a first comparison circuit of the plurality of comparison circuits coupled to the first and second floating diffusion regions, wherein no floating diffusion region is coupled to two comparison circuits, each of the comparison circuits configured to receive input signals from the respective two floating diffusion regions, compare the input signals, and output a comparison signal based on the comparison of the input signals;
  the first enable signal configured to enable the first configuration;
  transmitting a second enable signal to the image sensor system during a second frame period, the second enable configured to enable the second configuration;
  receive a sensor signal from the image sensor system, the sensor signal comprising comparison values based on the comparison signals; and
  detecting motion based on the sensor signal.

25. The method of claim 24, wherein the sensor signal comprises a two-color image, wherein a first color corresponds to a comparison value indicating no significant change in a pixel value from the first frame period to the second frame period, and a second color corresponds to a comparison value indicating a significant change in a pixel value from the first frame period to the second frame period.

26. The method of claim 25, wherein detecting motion based on the sensor signal comprises detecting motion based on the two-color image.

* * * * *